(12) United States Patent
Negami et al.

(10) Patent No.: US 7,938,883 B2
(45) Date of Patent: *May 10, 2011

(54) METHOD AND APPARATUS FOR MAKING METALLIC IRON

(75) Inventors: Takuya Negami, Tokyo (JP); Kazuo Kunii, Tokyo (JP); Shinichi Inaba, Hyogo (JP); Masataka Shimizu, Hyogo (JP); Isao Kobayashi, Osaka (JP); Yoshimichi Takenaka, Hyogo (JP); Toshihide Matsumura, Hyogo (JP); Akira Uragami, Osaka (JP); Takashi Kujirai, Osaka (JP); Osamu Tsuchiya, Hyogo (JP); Kimio Sugiyama, Osaka (JP); Shuzo Ito, Osaka (JP); Shoichi Kikuchi, Osaka (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 225 days.
This patent is subject to a terminal disclaimer.

(21) Appl. No.: 11/855,793

(22) Filed: Sep. 14, 2007

(65) Prior Publication Data

US 2009/0025511 A1 Jan. 29, 2009

Related U.S. Application Data

(60) Continuation of application No. 10/289,290, filed on Nov. 7, 2002, now abandoned, which is a division of application No. 09/891,653, filed on Jun. 26, 2001, now Pat. No. 6,506,231, which is a division of application No. 09/478,409, filed on Jan. 6, 2000, now Pat. No. 6,432,533, which is a division of application No. 08/818,954, filed on Mar. 14, 1997, now Pat. No. 6,036,744.

(30) Foreign Application Priority Data

| Mar. 15, 1996 | (JP) | 8-59801 |
|---|---|---|
| Sep. 27, 1996 | (JP) | 8-257114 |
| Sep. 27, 1996 | (JP) | 8-257115 |
| Sep. 27, 1996 | (JP) | 8-257116 |
| Sep. 27, 1996 | (JP) | 8-257117 |
| Sep. 27, 1996 | (JP) | 8-257118 |

(51) Int. Cl.
C21B 13/00 (2006.01)
C21B 13/08 (2006.01)
C21B 13/10 (2006.01)

(52) U.S. Cl. .......................................... 75/484; 75/771

(58) Field of Classification Search .................... 75/484
See application file for complete search history.

(56) References Cited

U.S. PATENT DOCUMENTS 3,033,673 A 5/1962 Coilin et al.
(Continued)

FOREIGN PATENT DOCUMENTS

CA 1049266 2/1979
(Continued)

OTHER PUBLICATIONS

United States Steel (U.S.S.). The Making, Shaping and Treating of Steel, 10th Edition, 1985, Association of Iron and Steel Engineers, pp. 400 and 510-511.
(Continued)

*Primary Examiner* — George Wyszomierski
*Assistant Examiner* — Tima M McGuthry-Banks
(74) *Attorney, Agent, or Firm* — Oblon, Spivak, McClelland, Maier & Neustadt, L.L.P.

(57) ABSTRACT

A method of making metallic iron in which a compact, containing iron oxide such as iron ore or the like and a carbonaceous reductant such as coal or the like, is used as material, and the iron oxide is reduced through the application of heat, thereby making metallic iron. In the course of this reduction, a shell composed of metallic iron is generated and grown on the surface of the compact, and slag aggregates inside the shell. This reduction continues until substantially no iron oxide is present within the metallic iron shell. Subsequently, heating is further performed to melt the metallic iron and slag. Molten metallic iron and molten slag are separated one from the other, thereby obtaining metallic iron with a relatively high metallization ratio. Through the employment of an apparatus for making metallic iron of the present invention, the above-described method is efficiently carried out, and metallic iron having a high iron purity can be made continuously as well as productively not only from iron oxide having a high iron content but also from iron oxide having a relatively low iron content.

22 Claims, 19 Drawing Sheets

U.S. PATENT DOCUMENTS

| | | | |
|---|---|---|---|
| 3,443,931 A | * | 5/1969 | Ahrendt et al. ............... 75/484 |
| 3,607,224 A | | 9/1971 | Blaskowski |
| 3,617,256 A | | 11/1971 | Joseph et al. |
| 3,628,947 A | * | 12/1971 | DeVaney ..................... 75/322 |
| 3,725,032 A | * | 4/1973 | Kihlstedt ..................... 75/318 |
| 3,751,241 A | | 8/1973 | Sloughfy et al. |
| 3,802,865 A | | 4/1974 | Ohkubo et al. |
| 3,807,986 A | | 4/1974 | Funk et al. |
| 3,814,404 A | | 6/1974 | Claflin |
| 3,912,501 A | | 10/1975 | De Castejon |
| 3,947,621 A | | 3/1976 | Collin et al. |
| 3,953,196 A | | 4/1976 | Obenchain |
| 4,254,167 A | | 3/1981 | Sulzbacher et al. |
| 4,372,779 A | | 2/1983 | Sugiyama et al. |
| 4,601,752 A | | 7/1986 | Santen et al. |
| 4,701,214 A | | 10/1987 | Kaneko et al. |
| 5,730,775 A | | 3/1998 | Meissner et al. |
| 5,738,694 A | | 4/1998 | Ford et al. |
| 5,810,905 A | | 9/1998 | Shultz |
| 6,036,744 A | * | 3/2000 | Negami et al. ............... 75/503 |
| 6,063,156 A | | 5/2000 | Negami et al. |
| 6,149,709 A | | 11/2000 | Uragami et al. |
| 6,210,462 B1 | | 4/2001 | Kikuchi et al. |
| 6,284,018 B1 | | 9/2001 | Uragami et al. |
| 6,413,295 B2 | | 7/2002 | Meissner et al. |
| 6,432,533 B1 | | 8/2002 | Negami et al. |
| 6,506,231 B2 | | 1/2003 | Negami et al. |
| 6,569,223 B2 | | 5/2003 | Tanigaki et al. |
| 6,602,320 B2 | | 8/2003 | Fuji et al. |
| 6,749,664 B1 | | 6/2004 | Hoffman et al. |
| 2002/0005089 A1 | | 1/2002 | Nagata et al. |

FOREIGN PATENT DOCUMENTS

| | | |
|---|---|---|
| CA | 1099516 | 4/1981 |
| DE | 25 14 325 | 10/1975 |
| FR | 1307112 | 2/1963 |
| FR | 1307575 | 2/1963 |
| FR | 1490774 | 11/1967 |
| HU | 196632 | 12/1988 |
| JP | 53 058 416 A | 5/1978 |
| RU | 396368 | 1/1974 |

OTHER PUBLICATIONS

Narcin et al., Reduction of iron ore pellets with domestic lignite coal in a rotary tube furnace, int. J. Miner. Process. 43 (1995) 49-59.

U.S. Appl. No. 12/094,607, filed May 22, 2008, Uragami et al.

U.S. Appl. No. 09/478,410, filed date Jan. 6, 2000, Inaba et al.

* cited by examiner

FIG. 2
1400°C
1450°C
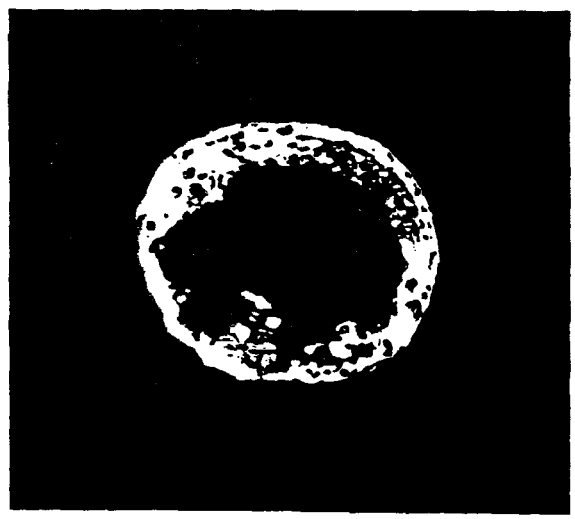
1500°C
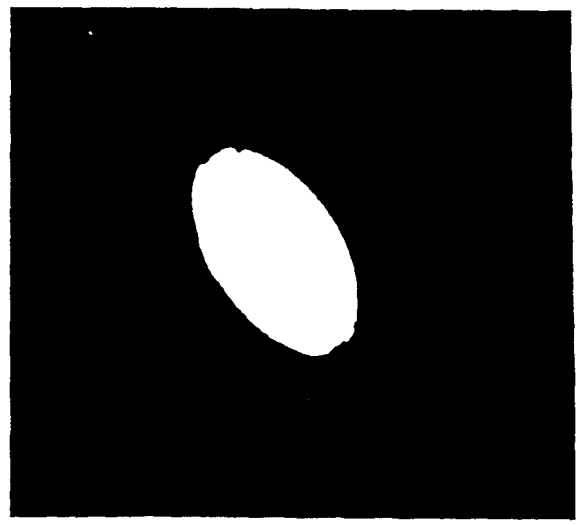

FIG. 3
TIME ELAPSED AFTER STARTING REDUCTION
3 min. 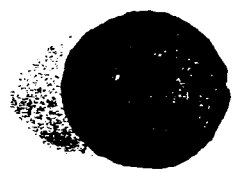
5 min. 
6 min. 
9 min. 
15 min. 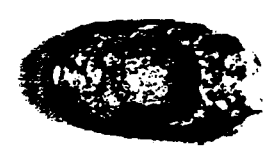

F I G. 13
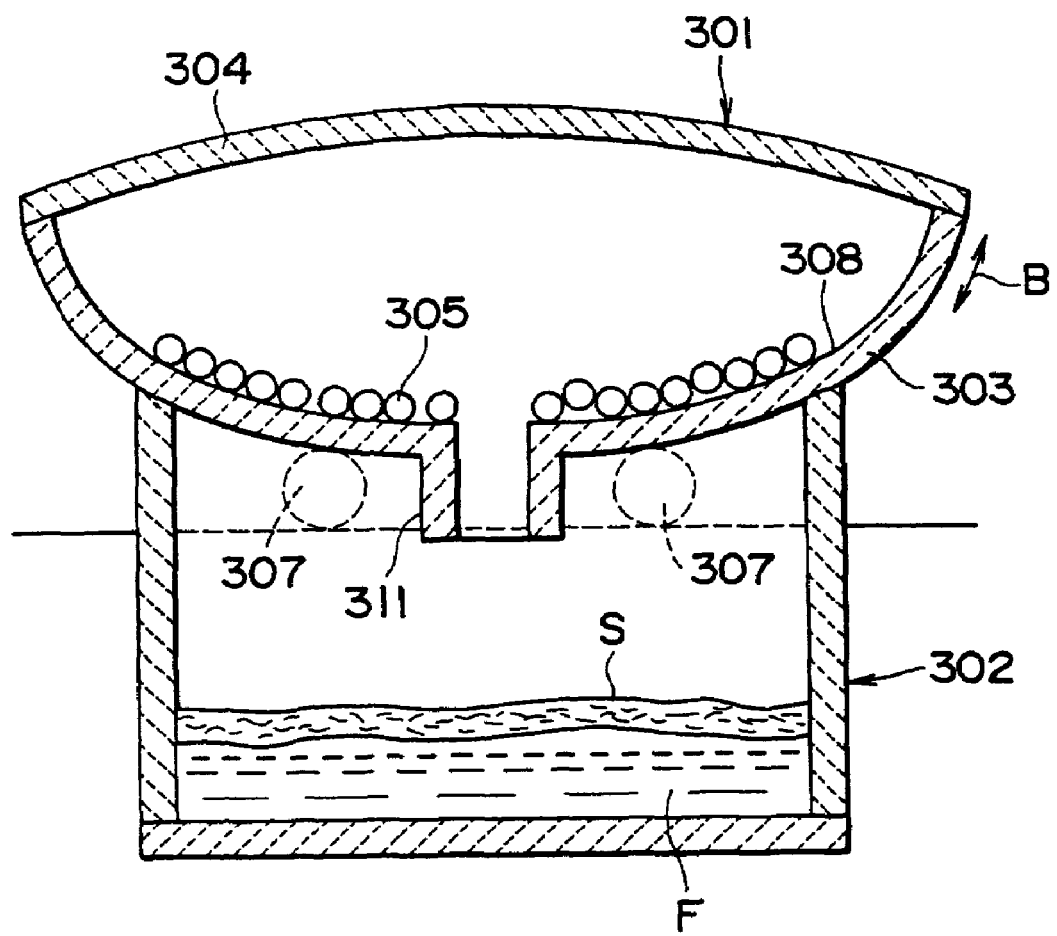

METHOD AND APPARATUS FOR MAKING METALLIC IRON

This application is a Continuation of U.S. application Ser. No. 10/289,290, filed Nov. 7, 2002, now abandoned; which is a Divisional application of U.S. application Ser. No. 09/891,653, filed Jun. 26, 2001, now U.S. Pat. No. 6,506,231; which is a Divisional application of U.S. application Ser. No. 09/478,409, filed Jan. 6, 2000, now U.S. Pat. No. 6,432,533; which is a Divisional application of U.S. application Ser. No. 08/818,954, filed Mar. 14, 1997, now U.S. Pat. No. 6,036,744.

TECHNICAL FIELD

The present invention relates to a method of obtaining metallic iron by subjecting iron oxides contained in iron ore or the like to reduction through the application of heat using a carbonaceous material as a reductant. More specifically, the invention relates to a method of efficiently making high purity metallic iron in which iron oxides are efficiently reduced into metallic iron while slag components including gangue and the like contained in an iron oxide source, such as iron ore, are melted and separated properly from metallic iron, and to a method and apparatus for industrially making metallic iron based on this method.

BACKGROUND ART

A conventional method of making direct reduced iron is where iron ore or pellets which contain iron oxide are directly reduced using a reducing gas to obtain reduced iron. An example is a shaft furnace method represented by the Midrex process. In this type of method of making direct reduced iron, a reducing gas made from natural gas or the like, is forced into a shaft furnace from a tuyere located at the bottom portion thereof to reduce iron oxides, thereby obtaining reduced iron.

In recent years, of particular interest has been a process of manufacturing reduced iron in which a carbonaceous material, such as coal, is used as a reductant in place of natural gas. Such a method has already been put into practice and is referred to as an SL/RN method in which indurated pellets manufactured from iron ore are subjected to reduction through the application of heat using coal as a reductant.

Another reducing iron-making process is disclosed in U.S. Pat. No. 3,443,931, in which a mixture of pulverized iron ore and pulverized coal are agglomerated, and the agglomerated mass is subject to reduction through the application of heat on a rotary hearth, in high temperature atmosphere, yielding reduced iron.

Reduced iron obtained using the above-mentioned methods is charged into an electric furnace directly as source iron or in the form of briquettes. With the increasing trend of recycling scrap in recent years, this reduced iron is of particular interest, since it may be used as a diluent of impurities contained in the scrap.

A conventional method, however, does not involve separating slag components such as $SiO_2$, $Al_2O_3$, and CaO contained in the iron ore or the like and in the carbonaceous material (coal or the like), from the molten iron produced. Therefore, the resultant reduced iron has a relatively low iron content (iron purity of metallic iron). In actual practice, these slag components are separated and removed during a subsequent refining process. However, an increase in the amount of slag not only decreases yield of refined molten iron, but significantly increases the running cost of an electric furnace. Therefore, reduced iron is required to be iron rich and have a relatively low content of slag components. In order to meet this requirement, it is necessary for the above-mentioned conventional reducing iron-making methods to use iron-rich iron ore, which narrows the choice of source materials for making iron.

Furthermore, a goal of the conventional methods described above is to obtain a reduced solid product as an intermediate product in an iron making process. Therefore, additional steps such as conveyance, storage, forming briquettes, and cooling are required before reduced iron is sent to the next refining process. These steps involve a large energy loss, and a briquetting step requires excess energy and a special apparatus.

In addition, a smelting reduction process such as the DIOS method is known in which iron oxides are directly reduced to obtain molten iron. In this method, iron oxides are pre-reduced to an iron purity of approximately 30 to 50%, and then molten iron in an iron bath is subjected to a direct reducing reaction with carbon, to obtain metallic iron. However, this method has problems; since two steps are required, pre-reduction and final reduction within an iron bath, the work is complicated, and in addition, due to direct contact between molten iron oxide (FeO) present in an iron bath and the refractory of a furnace, the refractory is significantly damaged.

Japanese Patent Publication (kokoku) No. 56-19366 discloses a method in which an agglomerate of metal oxide, a solid carbonaceous material, and slag materials is reduced through the application of heat to thereby enclose reduced metal with slag shell while maintaining the shape of the agglomerate, and then the slag shell is melted to separate metal from slag. This method must generate a sufficient amount of slag to completely enclose reduced metallic iron in order to prevent the metallic iron from being re-oxidized. Thus, the slag materials content must be increased. Furthermore, this method is likely to generate slag having a relatively high FeO content, which raises a serious problem, in practical application, of significantly damaging the refractory lining of equipment.

Thus, it is quite important to realize a method of making metallic iron having a relatively low content of slag components, since such a method adds more value to a metallic iron product, reduces the running cost of an electric furnace, and provides a flexible choice of source materials.

Since slag having a relatively large iron oxide content melts refractory, it is very important for industrial feasibility of this kind of iron-making process to reduce the iron oxide content of slag, generated accompanyingly in a process of reduction, in order to minimize damage to refractory.

DISCLOSURE OF INVENTION

The present invention has been achieved in view of the foregoing. An object of the present invention is to provide a method and apparatus of making metallic iron in which metallic iron, in either solid or molten form, having a very high purity, is readily and efficiently made from iron ore having a relatively low iron content or having a relatively high iron content, without damaging the refractory of a furnace via direct contact with molten iron oxide.

In the method of making metallic iron according to the present invention, iron oxide compacted with a carbonaceous reductant is subjected to reduction through the application of heat to yield metallic iron, the method having the following aspects:

(1) A shell containing metallic iron is generated and grown via reduction through the application of heat. The reduction normally is continued until substantially no iron oxide is present within the shell, during which slag aggregates within the shell.

(2) A metallic iron shell is generated and grown via reduction through the application of heat, the reduction is continued until substantially no iron oxide is present within the shell, and heating is further continued to allow slag generated within the shell to flow out from inside the shell.

(3) A metallic iron shell is generated and grown via reduction through the application of heat, the reduction is continued until substantially no iron oxide is present within the shell, and heating is further continued to allow molten metallic iron to separate from molten slag.

(4) A metallic iron shell is generated and grown via reduction through the application of heat, and the reduction is continued until substantially no iron oxide is present within the shell, during which slag aggregates within the shell, and then the aggregated slag is separated from metallic iron.

In order to embody aspect (2) described above, part of the metallic iron shell may be melted to allow molten slag to flow out from inside the shell. In this case or in order to embody aspect (3) described above, carburization may be continued within the metallic iron shell in the presence of a carbonaceous reductant so as to reduce the melting point of the metallic iron shell, thereby readily melting part or the entirety of the metallic iron shell.

When any of aspects (1) to (4) described above is embodied, a maximum temperature of heating for reduction may be controlled to be not less than the melting point of the accompanying slag and not more than the melting point of the metallic iron shell, so as to more efficiently conduct the reaction of generating metallic iron. This reducing step may be solid phase reduction, through which an iron oxide is reduced, and liquid phase reduction which is continued until substantially no iron oxide, composed mainly of FeO, is present, whereby the purity of the metallic iron obtained can be efficiently improved.

As used herein, the term "reduction is continued until substantially no iron oxide is present within the metallic iron shell" means, on a quantitative basis, that the reduction through the application of heat is continued until the content of iron oxide, composed mainly of FeO, is preferably reduced to 5% by weight or less, more preferably to 2% by weight or less. From a different point of view, this means that the reduction through the application of heat is continued until the content of iron oxide, composed mainly of FeO in the slag separated from metallic iron, is preferably not more than 5% by weight, more preferably 2% by weight or less.

The thus-obtained metallic iron having a high iron purity and accompanying slag may be melted by further heating so as to separate one from the other through differences in their specific gravities. Alternatively, they may be solidified by chilling, and then crushed to separate the metallic iron from the slag magnetically, or by any other screening method. Thus, it is possible to obtain metallic iron having a high iron purity, with a metallization ratio of not less than 95%, or in some cases of not less than 98%.

In carrying out the above-described method of the present invention, the compact of iron oxide containing a carbonaceous reductant may be granular or agglomerate, and be reduced through the application of heat in a manner having any of the following aspects:

1) The compact is moved in a horizontal direction.
2) The compact is placed on an iron belt, comprising walls formed at both edge portions thereof to prevent the compact from falling off the iron belt, and is moved in a horizontal direction.
3) The compact is placed on a horizontal surface.
4) The compact is tumbled.
5) The compact falls downward.

In addition, the compact may be elongated and reduced through the application of heat in a manner having any of the following aspects:

6) The elongated compact is moved downward in a vertical position.

Aspect 6) may be embodied as follows:
6-1) The elongated compact is continuously prepared and fed into a section where reduction is performed through the application of heat, the elongated compact comprising:
6-1-1) a support mesh made of iron and wrapping the elongated compact, or
6-1-2) an iron bar serving as a core thereof.

The above iron mesh or bar is preferably employed because it prevents the elongated compact from breaking at an intermediate position thereof due to its own weight while the elongated compact is moving downward.

7) The elongated compact is moved downward along a sloped surface.

Aspect 7) may be embodied as follows:
7-1) The elongated compact is placed on an iron belt and continuously fed into a section where reduction is performed through the application of heat.

Through employment of any of the above aspects, the aforementioned method of making metallic iron is more efficiently carried out.

An apparatus for making metallic iron according to the present invention carries out the above-described method of making metallic iron and has the following basic structure.

An apparatus for making metallic iron by reducing a compact of iron oxide containing a carbonaceous reducing agent through the application of heat comprises:
a thermal reduction apparatus for reducing the compact through the application of heat, thereby forming a shell comprising metallic iron and slag inside the shell;
a melting apparatus for melting the shell and the slag; and
a separator for separating the molten iron from the molten slag.

In the above-described apparatus for making metallic iron, when the compact is granular or agglomerate, the above-described thermal reduction apparatus may comprise a mechanism for reducing the compact through the application of heat while moving the compact in a horizontal direction. A preferred embodiment of the mechanism is an endless rotary member, comprising an endless rotary member and a hearth located on the member and used for placing the compact thereon. Separating members may be provided on the hearth at certain intervals to prevent the compact from adhering to another compact. The separating members are preferably formed of a desulfurizing agent, so that desulfurization can also be performed in a process of reduction through the application of heat.

The above-described mechanism may also be embodied in the form of an iron belt, comprising walls formed at both edge portions thereof to prevent the compact from falling off the iron belt, for conveying thereon the compact in a horizontal direction and for subjecting the compact to reduction through the application of heat during the horizontal conveyance of the compact.

A preferred embodiment of the above-described melting apparatus may comprise a sloped floor for tumbling or sliding the reduced compact thereon and for melting the tumbling or sliding compact through the application of heat.

When the compact is granular or agglomerate, another preferred embodiment of the thermal reduction apparatus may comprise a feeding member, comprising a horizontal plane, for intermittently feeding in the compact placed on the horizontal plane, a discharging member for discharging the compact from the feeding member, and a heating mechanism for heating the compact. The discharging member may be a tilting member for malting the position of the feeding member alternate between a horizontal position and a sloped position, or a pushing member for pushing out the compact from the feeding member, thereby smoothly discharging the compact.

An iron support may be placed on the feeding member and adapted to be discharged together with the compact. Separating members (preferably formed of a desulfurizing agent) are preferably provided on the feeding member at certain intervals to prevent the compact from adhering to another compact.

A preferred embodiment of the feeding member may comprise an iron belt for continuously conveying the compact thereon and for subjecting the compact to reduction through the application of heat. This avoids a problem that part of the reduced compact melts and adhesively accumulates on the internal surface of a furnace. When this embodiment is employed, the iron belt used for feeding in the compact is melted with reduced metallic iron to become molten iron.

A preferred embodiment of the aforementioned melting apparatus may comprise a sloped floor for melting the compact by application of heat while tumbling or sliding the compact thereon.

For more efficient reduction through the application of heat, the aforementioned thermal reduction apparatus may preferably comprise:

a mechanism for reducing the compact through the application of heat while tumbling the compact, or a mechanism of tumbling, comprising a tumbling surface for tumbling the compact thereon and a discharging unit for discharging the compact from the tumbling surface, and a thermal reduction member for heating the compact.

The above-described thermal reduction apparatus and the melting apparatus may be integrated into a thermal reduction-melting apparatus, which comprises a mechanism of tumbling, comprising a sloped tumbling surface for gradually tumbling down the compact along a sloped direction and a discharging section for discharging the compact from the sloped tumbling surface, and a mechanism for reducing and melting the compact through the application of heat. This enables reduction and melting through the application of heat to be performed continuously and efficiently.

In the above-described thermal reduction-melting apparatus, the tumbling surface preferably comprises the interior surface of a channel-like member having an arc-shape, V-shape, or the like recess and is sloped along the length of the channel-like member. This enables smoother reduction and melting through the application of heat.

A further embodiment of the thermal reduction apparatus which receives the granular or agglomerate compact may comprise a mechanism for allowing the compact to fall downward and for reducing the falling compact through the application of heat. Alternatively, the thermal reduction-melting apparatus integrally comprising the thermal reduction apparatus and the melting apparatus may further comprise a space for allowing the granular compact to fall downward and a heating member for reducing and melting the granular compact through the sequential application of heat while the granular compact is falling.

The separator preferably comprises a submerged weir for receiving molten slag and molten iron falling from above on one side thereof and for releasing the molten slag from one side thereof and the molten iron from the other side thereof. Thus, the molten iron and the molten slag are continuously and readily separated one from the other.

When an elongated compact is used, the thermal reduction apparatus may comprise a mechanism for reducing the elongated compact through the application of heat while moving the elongated compact downward in a vertical position or along a downward sloped surface. This allows the elongated compact to be continuously reduced through the application of heat while it moves downward in a vertical position or along the downward sloped surface.

When the elongated compact is used, the elongated compact may be continuously fed onto an iron belt through an feeder, so that the elongated compact on the iron belt is continuously conveyed into a thermal reduction apparatus, where the elongated compact is reduced through the application of heat. In this case, the iron belt is also melted in a melting process with metallic iron generated in the reducing process, and collected in the form of molten iron.

Preferably, the apparatus for making metallic iron according to the present invention may further comprises means for feeding an iron belt for conveying the compact thereon, thereby feeding the compact on the iron belt into the thermal reduction apparatus and a melting apparatus for reducing and melting the compact through the application of heat. In this case, when the compact is granular or agglomerate, the iron belt may comprise walls formed at both edge portions thereof to prevent the compact from falling off the iron belt and may convey the compact thereon in a horizontal direction within the thermal reduction apparatus for reducing the compact through the application of heat. When the compact is in an elongated form, there may be provided forming means for continuously forming the elongated compact and for feeding the elongated compact onto the iron belt, thereby continuously forming the elongated compact and subjecting it to reduction and melting through the application of heat. The iron belt used is melted in the melting apparatus to thereby be merged with metallic iron, generated through reduction, and collected in the form of molten iron.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIG. 2 is a set of photographs showing cross-sections of pellets subjected to reduction through the application of heat at different temperatures;

FIG. 3 is a set of photographs showing a change in the appearance of a reduced pellet observed when the reducing time is varied at a reducing temperature of 1500° C.;

FIG. 13 is a schematic cross-sectional view taken along line A-A of FIG. 12;

BEST MODE FOR CARRYING OUT THE INVENTION

Figure 1A:
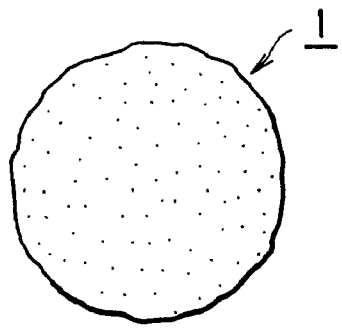
FIGS. 1 (A) to (F) are cross-sectional views of a compact schematically illustrating the progress of a reducing reaction when a method of the present invention is carried out.
Figure 1D:
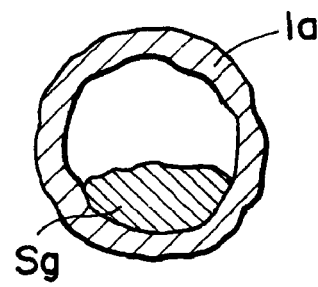
Figure 1B:
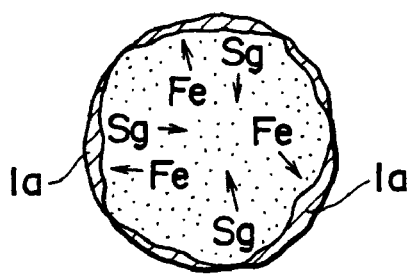
Figure 1E:
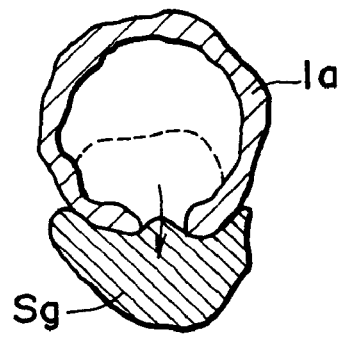
Figure 1C:
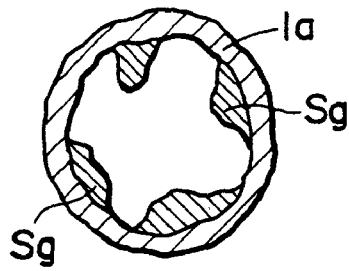
Figure 1F:
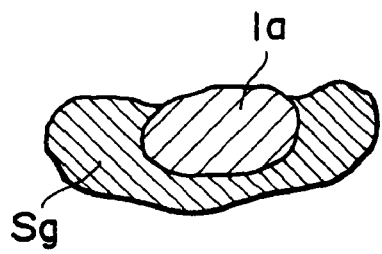
Figure 4:
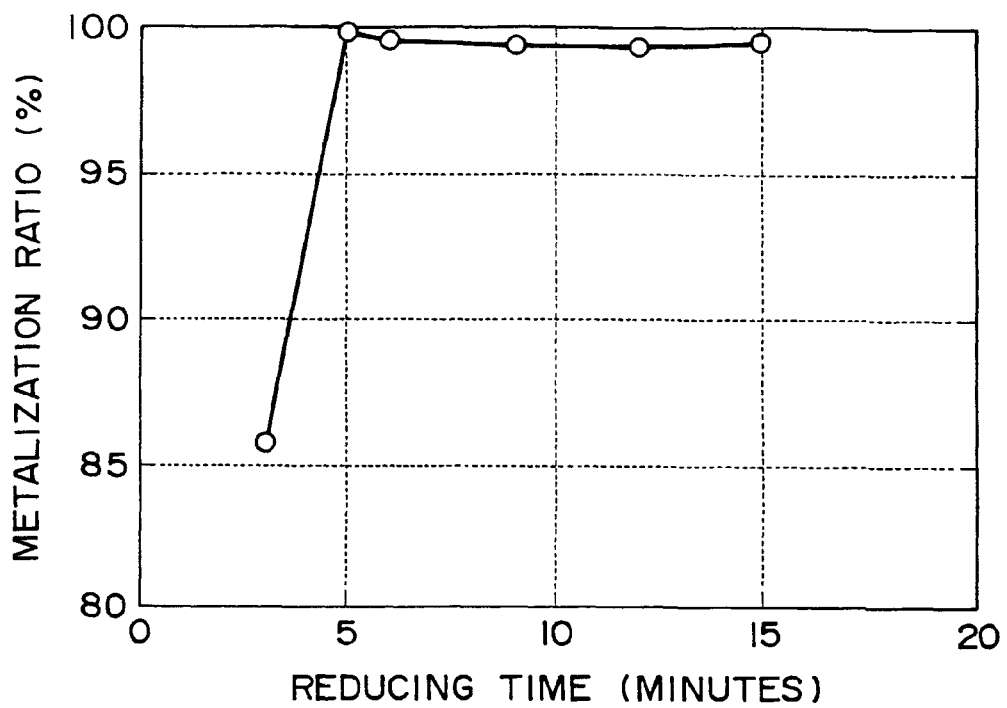
FIG. 4 is a graph showing a change in the metallization ratio of reduced pellets with reducing time at a reducing temperature of 1500° C.
Figure 5:
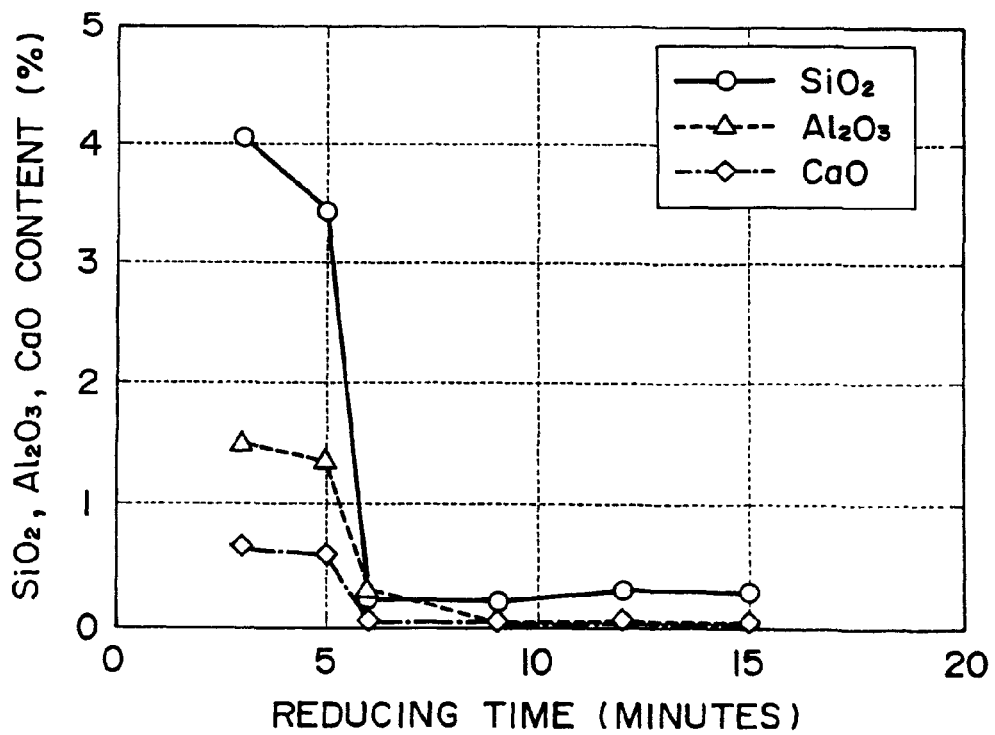
FIG. 5 is a graph showing a change in the content of slag constituents with reducing time at a reducing temperature of 1500° C.
Figure 6:
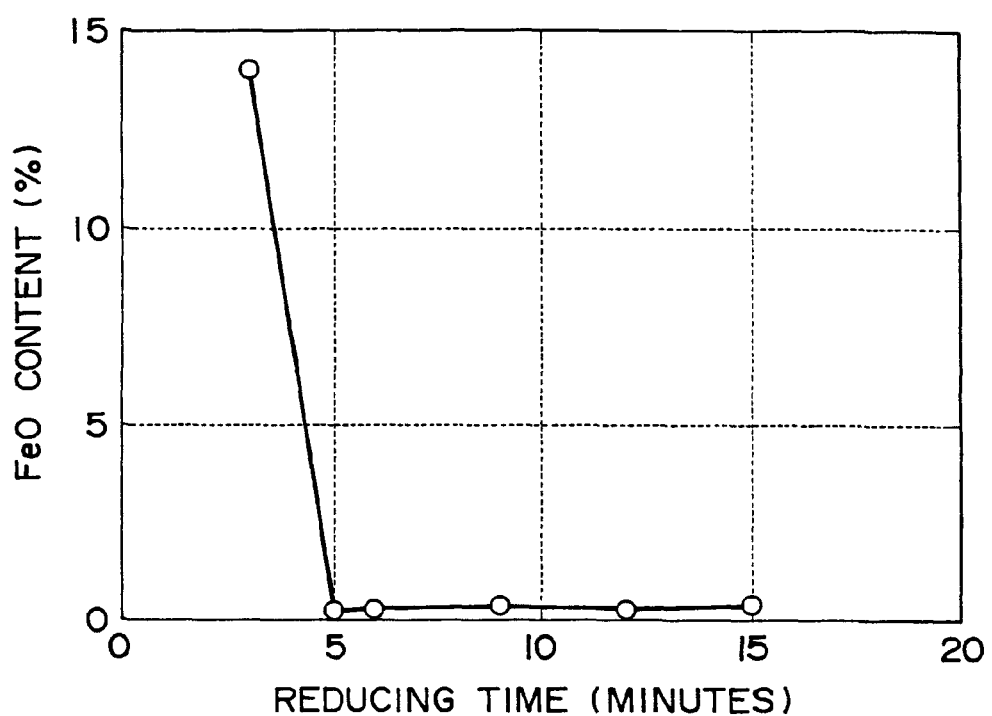
FIG. 6 is a graph showing a change in the FeO content of reduced pellets with reducing time at a reducing temperature of 1500° C.
Figure 7:
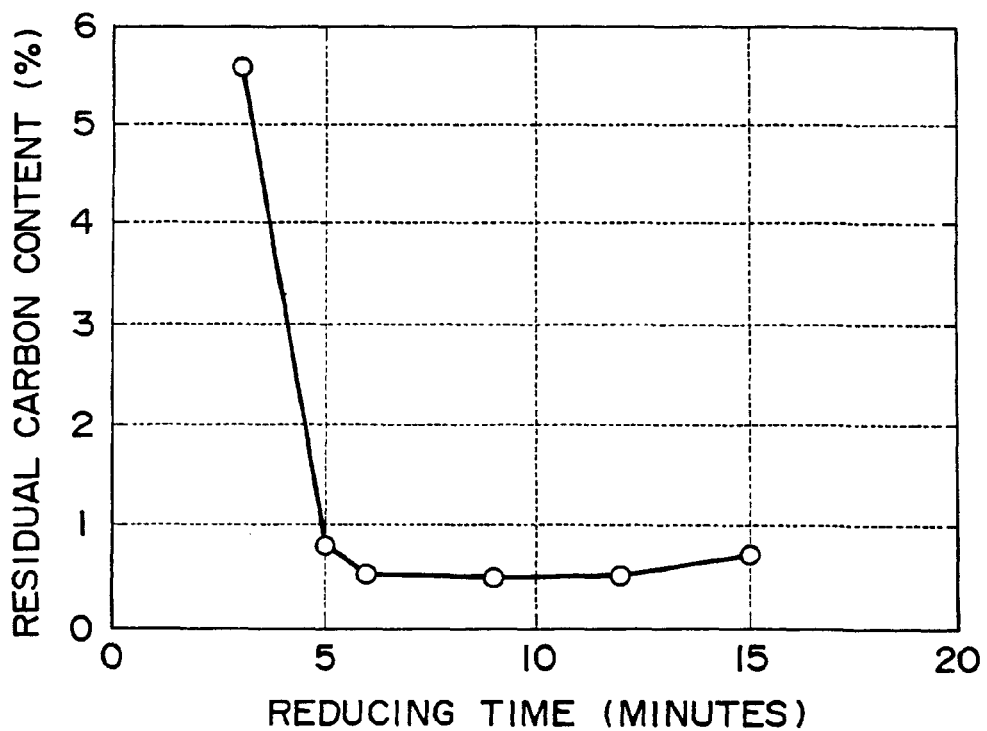
FIG. 7 is a graph showing a change in the carbon content of reduced pellets with reducing time at a reducing temperature of 1500° C.

A method of making metallic iron according to the present invention, involves compacting the pulverized mixture, composed of iron ore which contains iron oxides and coal or the like acting as a carbonaceous reductant, to grains, pellets, or to any other forms. A feature of the method is that a metallic iron shell is generated and grown via reduction through the application of heat. The reduction is continued until substantially no iron oxide is present within the shell.

In the process of studying a new method of making metallic iron, which may replace both indirect iron making methods such as a method using a blast furnace, and direct iron making methods such as the heretofore mentioned SL/RN method, the present inventors found that when compacts, in grains, pellets, or in any other form, of pulverized iron oxides and carbonaceous reductant are heated in a non-oxidizing atmosphere, the following phenomenon occur. When a compact is heated, the carbonaceous reductant contained in the compact reduces iron oxides in the following manner: the reduction continues from the periphery of the compact, and metallic iron generated during the incipient stage of the reduction diffuse and join together on the surface of the compact to form a metallic iron shell on the periphery of the compact. Subsequently, reduction of iron oxides by the carbonaceous reductant progresses efficiently within the shell, so that a state is established within a very short period of time such that substantially no iron oxide is present within the shell. The thus generated metallic iron adheres to the inner surface of the shell, and the shell grows accordingly. On the other hand, most of the by-product slag, which is derived from both gangue contained it an iron oxide source, such as iron ore, and the ash content of a carbonaceous reductant, aggregates within the metallic iron shell. Thus, metallic iron having a relatively high iron purity and constituting the shell can be efficiently separated from the aggregated slag.

This phenomenon, which occurs during reduction and will be described later with reference to photos, is believed to occur in the following manner. FIGS. 1 (A) to 1 (F) show cross-sectional views of a compact schematically illustrating the phenomenon which occurs when the method of the present invention is carried out. When a compact 1 composed of an iron oxide-containing material and a carbonaceous reductant and having a form shown in FIG. 1 (A) is heated, for example, to a temperature of 1450 to 1500° C. in a nonoxidizing atmosphere, the reduction of iron oxides progresses from the periphery of the compact 1, and metallic iron generated diffuses and joins together to form a metallic iron shell 1a (FIG. 1 (B)). Subsequently, as heating continues, iron oxides within the shell 1a are quickly reduced, as shown in FIG. 1 (C), through reduction by the carbonaceous reductant present within the shell 1a and reduction by CO generated by a reaction between the carbonaceous reductant and iron oxides. The thus generated metallic iron Fe adheres to the inner surface of the shell, and the shell grows accordingly. On the other hand, as shown in FIG. 1 (D), most of the by-product slag Sg derived from the above-mentioned gangue and the like aggregates within the cavity defined by the shell 1a.

The reduction through the application of heat is represented by the following schemes:

$$FeO_a + xC \rightarrow Fe + xCO \tag{1}$$

$$FeO_x + (x/2)C \rightarrow Fe + (x/2)CO_2 \tag{2}$$

$$Y = y_1 + y_2 \tag{3}$$

where Y: chemical equivalent (mol) of carbon required for reduction $y_1$: amount (mol) of carbon required for reaction represented by scheme (1)

$y_2$: amount (mol) of carbon required for reaction represented by scheme (2)

When compacts are prepared using an iron oxide, containing material and a carbonaceous reductant, the mixing ratio between iron oxides and the carbonaceous reductant is adjusted such that the amount of the carbonaceous reductant is not less than a theoretical equivalent expressed by scheme (3). This allows reduction through the application of heat to progress efficiently.

As described above, according to the present invention, the metallic iron shell 1a is formed on the periphery of the compact 1 during the incipient stage of reduction through the application of heat, and the reduction progresses further within the cavity defined by the shell 1a, thereby significantly improving the efficiency of the reduction. Preferably, an ultimate temperature of heating for reduction may be controlled so as to be not less than the melting point of the accompanying slag and not more than the melting point of the metallic iron shell 1a. If the ultimate temperature of heating is equal to or greater than the melting point of the metallic iron shell 1a, generated metallic iron will immediately fuse and aggregate; consequently, the metallic iron shell 1a will not form and the subsequent reducing reaction will not progress efficiently. Also, if non-reduced molten iron oxide flows out from inside the metallic iron shell 1a, it may be highly likely to damage the refractory of the furnace. On the other hand, when the ultimate temperature of heating for reduction is controlled so as to be not less than the melting point of the accompanying slag, the by-product slag fuses and aggregates, and metallic iron diffuses and joins together intensively; consequently, the metallic iron shell 1a grows accordingly while slag Sg is separating from the shell 1a as shown in FIGS. 1 (C) and (D).

As described above, a key feature of the present invention is that "a metallic iron shell is formed within which a reducing reaction progresses efficiently," which is not employed in conventional indirect and direct iron-making methods and which significantly enhanced reduction through the application of heat. The metallic iron shell 1a grows as a carbonaceous reductant contained in the compacts progressively reduces the compacts. Once the metallic iron shell 1a is formed, the carbonaceous reductant and the generated CO continue reduction within the shell 1a. Hence, the atmosphere for reduction through the application of heat does not need to be reducing, but may be a non-oxidizing atmosphere such as a nitrogen gas atmosphere. This is a significant difference from the conventional methods.

All the reducing agent necessary for reducing the iron oxide is present in the pellet. No external reducing agent is needed; neither solid nor gaseous reducing agents need to be added during the reduction process. The reducing agent used in the process may be only the carbonaceous reductant present in the compact. Furthermore, the metallic iron shell may be in contact with the atmosphere in the furnace; there is no need to coat or cover the shell.

Basically, the above-stated reduction through the application of heat progresses in the form of a solid phase reduction, which does not cause the metallic iron shell 1a to melt. Conceivably, liquid phase reduction also progresses at the latter or end stage of the reducing reaction for the following reason. The interior of the metallic iron shell 1a is believed to maintain a highly reducing atmosphere because of the presence of a carbonaceous reductant and CO generated by the reducing reaction of the reductant, resulting in a significant rise in reduction efficiency. In such a highly reducing atmosphere, metallic iron generated within the shell 1a is subjected to carburization, so that its melting point gradually reduces. As a result, at the latter or end stage of the reducing reaction, part of the compacts melt, so that iron oxides undergo liquid phase reduction. By setting a relatively low reducing temperature, reduction can be carried out entirely in the solid phase. However, the higher the reducing temperature, the higher the reaction ratio of reduction, and so a relatively high reducing temperature is advantageous to complete the reducing reaction within a short period of time. Hence, it is desirable that the reducing reaction ends with liquid phase reduction.

Whether or not the above-mentioned reducing reaction is completed can be confirmed by measuring the concentration of CO or $CO_2$ contained in the atmosphere of gas produced by the reduction through the application of heat. In other words, the gas generated is extracted at appropriate intervals of time from inside the furnace of the reducing reaction. When no CO or $CO_2$ is detected from the gas, it indicates the completion of the reducing reaction. This method uses the fact that the reduction through the application of heat involves a reducing reaction carried out by a carbonaceous reductant itself and a reducing reaction carried out by the CO gas which is generated by the reaction between the carbonaceous reductant and iron oxides. After the iron oxides are all reduced, CO and $CO_2$ are no longer generated.

In actual practice, there is no need to continue the reaction until the release of the CO and $CO_2$ gases terminates completely. The present inventors have confirmed that it depends on the inner volume of the furnace used for the reaction, but when the concentration of the CO and $CO_2$ gases in the furnace gas drops to approximately 2 volume % or less, not less than 95% by weight of iron oxides are reduced; when the gas concentration drops to about 1 volume % or less, not less than 98% by weight of iron oxides are reduced.

In the state shown in FIG. 1 (D), iron oxides composed mainly of FeO and contained in the compact are substantially all reduced to metallic iron (iron oxide content, indicative of the progress of the reduction, is usually not more than 5% by weight and is experimentally confirmed to be not more than 2% by weight or not more than 1% by weight), and some iron oxides composed mainly of FeO and fused into the internal aggregate of molten slag Sg are also mostly reduced (content of iron oxides composed mainly of FeO contained in the slag, indicative of the progress of the reduction, is usually not more than 5% by weight and is experimentally confirmed to be not more than 2% by weight or not more than 1% by weight). Accordingly, metallic iron having a relatively high iron purity can be efficiently obtained by chilling compacts in the state of FIG. 1 (D), crushing their metallic iron shell 1a with a crusher, and magnetically selecting metallic iron from slag. Alternatively, heating at the same temperature or a higher temperature may be continued subsequently to the establishment of the state of FIG. 1 (D), whereby part or all of the metallic iron shell 1a is melted so as to separate the slag from metallic iron, which will be described below.

When heating is continued at a slightly higher temperature, as needed, subsequent to the establishment of the state of FIG. 1 (D), part of the metallic iron shell 1a melts, for example, as shown in FIG. 1 (E). This allows the accompanying slag Sg to flow out from inside the shell 1a, thereby facilitating the separation of metallic iron from the slag. Alternatively, heating may be continued to establish the state shown in FIG. 1 (E), whereby the entire metallic iron shell 1a melts and aggregates, in order to be separated from the slag Sg which had previously melted and aggregated. Then, the thus prepared mass in the state shown in FIG. 1 (E) or (F) is processed by a crusher or the like to crush the fragile slag only, leaving metallic iron in agglomerates. The crushed mass is then subjected to screening using a screen having an appropriate mash or to magnetic separation, thereby readily obtaining metallic iron having a relatively high iron purity. In addition, the difference in specific gravity between metallic iron and slag may be used to separate molten metallic iron from molten slag.

The metallic iron shell can be melted not only by heating at a higher temperature subsequently to the completion of the reducing reaction but also by reducing the melting point of the metallic iron shell through carbonization. At the last stage of the reduction progressing within the metallic iron shell, the internal atmosphere, which is strongly reducing, causes reduced iron to be carburized with a resultant reduction in the melting point of the reduced iron. Hence, even by maintaining the reducing temperature, the metallic iron shell can be melted due to the reduction in its melting point.

Carbonaceous reductants usable with the present invention include coal, coke or other similar carbonaceous materials treated by dry distillation, petroleum coke, and any other form of carbonaceous materials. In actual use, mined coal is pulverized and screened to obtain coal powder for use, and coke is also pulverized. In addition, for example, blast furnace dust may be used which is collected as waste which contains carbonaceous materials. However, in order to efficiently progress the reaction of reduction through the application of heat, a carbonaceous reductant to be used contains carbon preferably not less than 70% by weight, more preferably not less than 80% by weight. However, such matter containing iron oxides and carbonaceous reductant therein as blast furnace dust is not limited to this amount. For example, in the case of blast furnace dust, it may be possible to contain carbon not less than 20% by weight. In addition, in order to increase the specific surface area of the carbonaceous reductant, its grain size is preferably not more than 2 mm, more preferably not more than 1 mm. Likewise, in order to improve the efficiency of a reducing reaction through an increase in the specific surface area of iron ore or iron oxide-containing materials, its grain size is preferably not more than 2 mm, more preferably not more than 1 mm.

In the present embodiment, an iron oxide and a carbonaceous reductant and, as needed, a binder, are homogeneously mixed and then formed into agglomerates, grains, briquettes, pellets, bars, or other forms of compacts, and the resulting compacts are subjected to reduction through the application of heat. The amount of the carbonaceous reductant to be mixed in is not less than a theoretical chemical equivalent required for a reducing reaction represented by the aforesaid schemes (1) to (3). The amounts of y1 and y2 represented by schemes (1) and (2) vary with material conditions (chemical composition, grain size, pellet size, etc.) and reduction temperature. However, the theoretical chemical equivalent is determined by measuring the CO and $CO_2$ density of gases which is generated in a small reduction apparatus where pellets are reduced at a specified temperature. The pellets are added with carbonaceous reductant slightly more than a necessary amount for an assumed reduction case of scheme (1) only. Preferably, the carbonaceous reductant is used in excess, in consideration of the amount consumed or carburization to lower the melting point of the metallic iron shell.

As heretofore mentioned, preferably, an ultimate temperature during reduction through the application of heat is not less than the melting point of the by-product slag and not more than the melting point of the metallic iron shell. However, it is not necessarily adequate to absolutely predetermine the ultimate temperature because the temperature of slag varies depending on the amount gangue contained in iron ore or other iron oxide sources and depending on the amount of iron oxide contained in the slag. Nevertheless, the reducing temperature falls preferably in the range of 1350 to 1540° C., preferably in the range of 1400 to 1540° C., more preferably in the range of 1430 to 1500° C. Such a temperature range of reduction provides metallic iron having as high an iron purity of not less than 95% by weight in metallization ratio, usually not less than 98% by weight, and in excellent cases not less than 99% by weight.

As for the by-product slag, its content of iron oxides composed mainly of FeO can be reduced to not more than 5% by weight, usually not more than 2% by weight, or under more adequate conditions of reduction through the application of heat, not more than 1% by weight. This feature is advantageous to prevent damage to the refractory wall of a furnace caused by direct contact with molten iron oxide. According to the heretofore mentioned conventional reducing iron-making methods, when iron oxides contained in iron ore or the like are subjected to reduction through the application of heat using a carbonaceous material, or when metallic iron obtained through reduction is separated from accompanying slag, a considerable amount of iron oxides composed mainly of FeO is left unreduced in the slag, causing damage to the refractory of the furnace. According to the present invention, iron oxides composed mainly of FeO contained in slag are mostly reduced, so that almost no iron oxide or only a very small amount of iron oxide, if any, is left unreduced in the slag. Thus, the problem of damage to the refractory of a furnace does not occur, not only at the reducing step, but also at the subsequent slag separating step.

Since the thus obtained metallic iron has a relatively high iron purity and does not contain constituents of slag, it can be used intact as long as it is used as a diluent in a steel making process. However, since the metallic iron contains a considerable amount of impurities such as sulfur and phosphorus it needs to be refined so as to reduce the impurities, if the impurities raise any problems. In addition, the metallic iron allows its carbon content to be adjusted.

The metallic iron may form a continuous closed shell. In this form, most, if not all, of the reduced iron is in a single piece or mass, separate from the slag. Even after the shell has been partially or completely melted most of the reduced iron is in the form of a single piece or mass.

When the present invention is carried out, preferably, a grown metallic iron shell is not allowed to melt while molten slag is aggregating, and also at the subsequent step of separating slag from metallic iron, the metallic iron is not allowed to melt. This practice minimizes the amount of sulfur and phosphorus contained in the obtained metallic iron. The mechanism of this practice is described below. After completion of reduction, if metallic iron, together with slag, is melted, part of the sulfur and phosphorus contained in the molten slag may mingle with the molten metallic iron. However, if at the reducing step and the subsequent slag separating step, metallic iron is held in the solid state and only slag is melted for separation from the metallic iron, sulfur and phosphorus contained in the carbonaceous reductant, such as coal, melt into the molten slag and are removed together with the slag, thereby minimizing entry of sulfur and phosphorus into the metallic iron.

The present invention will next be described in detail by way of embodiments, which should not be construed as limiting the invention. Variations and modifications are possible without deviating from the gist of the invention.

Embodiment 1

Coal powder (carbonaceous reductant), iron ore (iron-containing material), and binder (bentonite), each having a composition shown in Table 1 and an average grain diameter of not more than 45 µm, were mixed in the mixing ratio shown in Table 1. The resulting mixture was formed into substantially spherical pellets having 17 mm diameters. The thus formed pellets were subjected to reduction through the application of heat in a non-oxidizing atmosphere (nitrogen gas atmosphere) for 20 minutes at 1400° C., 1450° C., and 1500° C., followed by cooling. The cross-sections of the reduced pellets were observed. FIG. 2 shows typical photographs of their cross-sections. In the tables "T." stands for "total", and "M." stands for "metallic".

TABLE 1

Pellet Making Conditions

| Iron ore | Mixing Ratio (%) 80.3 | T•Fe (%) 69.7 | FeO (%) 38.5 | SiO$_2$ (%) 1.7 | Al$_2$O$_3$ (%) 0.44 | CaO (%) 0.5 |
|---|---|---|---|---|---|---|
| Coal | Mixing Ratio (%) 18.5 | Total Carbon (%) 83.5 | Fixed Carbon (%) 78.4 | Volatile matter (%) 17.1 | Ash Content (%) 4.5 | |
| Binder | Mixing Ratio (%) 1.2 | SiO$_2$ (%) 69.2 | Al$_2$O$_3$ (%) 14.7 | CaO (%) 0.9 | | |
| Pellet | T•Fe (%) 56.1 | Total Carbon (%) 15.4 | Volatile matter (%) 14.4 | SiO$_2$ (%) 3.3 | Al$_2$O$_3$ (%) 0.9 | CaO (%) 0.5 |

As seen from FIG. 2, in pellets subjected to reduction through the application of heat at a temperature of 1400° C. and 1450° C., a metallic iron shell is formed on their surface while metallic iron adheres to the internal surface of the shell as it accumulates, and slag agglomerates separately from the shell in an internal space defined by the shell. In a pellet subjected to reduction through the application of heat at a temperature of 1500° C., it seems that once formed, the metallic iron shell melted after the reducing reaction had completed, and then the molten metallic iron and molten slag solidified to mutually separated metallic iron having metallic luster, and a vitreous mass, respectively (the corresponding photograph in FIG. 2 show only metallic iron obtained by removing slag after crushing). Table 2 shows the chemical composition of the reduced pellets, and Table 3 shows the chemical composition of the vitreous slag.

TABLE 2

Chemical Composition of Reduced Pellets
Reducing time: 20 minutes
Unit: % by weight

| Reducing Temperature | 1400° C. | 1450° C. | 1500° C. |
|---|---|---|---|
| T•Fe | 94.20 | 94.33 | 99.10 |
| M•Fe | 89.42 | 93.02 | 98.88 |
| FeO | 4.70 | 0.79 | 0.28 |
| SiO$_2$ | 2.21 | 1.44 | 0.22 |
| Al$_2$O$_3$ | 1.02 | 0.45 | 0.01 |
| CaO | 0.43 | 0.20 | 0.01 |
| Total carbon | 0.60 | 0.42 | 0.49 |
| S | 0.062 | 0.068 | 0.072 |
| Metallization ratio (%) | 94.93 | 98.61 | 99.78 |

TABLE 3

Chemical Composition of Vitreous Matter
Unit: % by weight

| M•Fe | FeO | CaO | SiO$_2$ | Al$_2$O$_3$ |
|---|---|---|---|---|
| 8.46 | 0.18 | 4.47 | 57.53 | 1.55 |

As seen from Table 2, in pellets subjected to reduction at a temperature of 1500° C., solidified metallic iron (see FIG. 2) having an elliptical shape and metallic luster contains almost no slag constituents, and the reduced metallic iron having a metallization ratio of not less than 99% by weight is substantially completely separated from the slag. On the other hand, in pellets subjected to reduction at a temperature of 1400° C. or 1450° C., a metallic iron shell still remains, and their chemical compositions seem to indicate that reduction of iron oxide is insufficient. However, as seen from FIG. 2, in those pellets, a metallic iron shell is already separated from aggregated slag within the shell. This implies that granular metallic iron having a relatively high iron purity can be obtained by: crushing reduced pellets and collecting metallic iron through magnetic separation; continuing heating at a higher temperature to melt part of the metallic iron shell to thereby allow molten slag to flow out from inside the shell, followed by separation of metallic iron from slag; or continuing heating at a higher temperature to melt the entire metallic iron shell and then allowing molten metallic iron and molten slag to aggregate separately from each other.

FIG. 3 shows a change in appearance of a pellet observed when reducing time is varied from 3 minutes through 15 minutes at a reducing temperature of 1500° C. Table 4 shows the chemical composition of each reduced pellet corresponding to each reducing time. FIGS. 4 to 7 show a change in metallization ratio, content of slag constituents, iron oxide content, and carbon content, respectively, with reducing time.

TABLE 4

Effect of Reducing Time on Chemical
Composition of Reduced Pellet
Unit: % by weight

| Reducing time (min.) | 3 | 5 | 6 | 9 | 12 | 15 |
|---|---|---|---|---|---|---|
| T•Fe | 83.75 | 92.35 | 98.50 | 98.75 | 99.03 | 98.98 |
| M•Fe | 71.75 | 92.16 | 98.04 | 98.08 | 98.30 | 98.40 |
| FeO | 14.01 | 0.23 | 0.27 | 0.29 | 0.20 | 0.34 |
| SiO$_2$ | 4.04 | 3.42 | 0.22 | 0.18 | 0.27 | 0.27 |
| Al$_2$O$_3$ | 1.49 | 1.34 | 0.29 | 0.01 | 0.01 | 0.01 |
| CaO | 0.64 | 0.56 | 0.03 | 0.01 | 0.01 | 0.01 |
| Total carbon | 5.57 | 0.79 | 0.51 | 0.46 | 0.48 | 0.68 |
| S | 0.061 | 0.064 | 0.066 | 0.066 | 0.071 | 0.074 |
| Metallization ratio (%) | 85.67 | 99.79 | 99.53 | 99.32 | 99.26 | 99.41 |

As seen from FIG. 3, 3 minutes after heating has started, no particular change in appearance is observed with the pellet. However, as seen from Table 4, reduction of iron oxide is considerably progressed in the pellet. 5 minutes after heating has started, the pellet surface exhibits an apparent metallic luster indicative of a metallic iron shell being formed. In addition, the T. Fe content of the metallic iron is in excess of 90% by weight. 6 minutes later, the T. Fe content of the metallic iron is as high as not less than 98% by weight as shown in Table 4.

At this point of time, it is observed that part of the metallic iron shell melts to allow molten slag to flow out from inside the shell. 9 minutes later, most of the metallic iron shell melts and aggregates in a fried egg like shape, in which metallic iron agglomerates in the position corresponding to the yolk, and vitreous slag aggregates around the metallic iron in the position corresponding to the white of the egg. After this point of time, the shape of the metallic iron and slag varies somewhat, but as seen from Table 4, the T. Fe concentration in the metallic iron shows almost no further increase. This indicates that the reducing reaction of iron oxides contained in a pellet progresses quickly and is almost completed while the metallic iron shell is formed and, once the metallic iron shell is formed, under an enhanced reducing condition established within the shell, after which the separation of the metallic iron from slag progresses with time. As seen from Table 4 and FIGS. 4 to 7, 6 minutes after reduction through the application of beat starts, the slag and FeO content of the obtained metallic iron is reduced to a very low level, whereby metallic iron having a metallization ratio of not less than 99% is obtained.

As will be easily understood, if the compact composed of an iron oxide-containing material and a carbonaceous reductant contains as much carbonaceous reductant as equal to or greater than the equivalent required for reducing iron oxides contained in the compact, then when the compact is heated at a temperature of about 1400° C. or higher, a metallic iron shell will form on the periphery of the compact at the incipient stage of heating, and subsequently iron oxide will be quickly reduced within the metallic iron shell, while molten slag is separated from metallic iron. When the reducing temperature is increased to 1500° C., a reducing reaction and the separation of metallic iron from slag progress within a very short period of time, whereby metallic iron having a very high iron purity is obtained at a relatively high yield.

Figure 8:
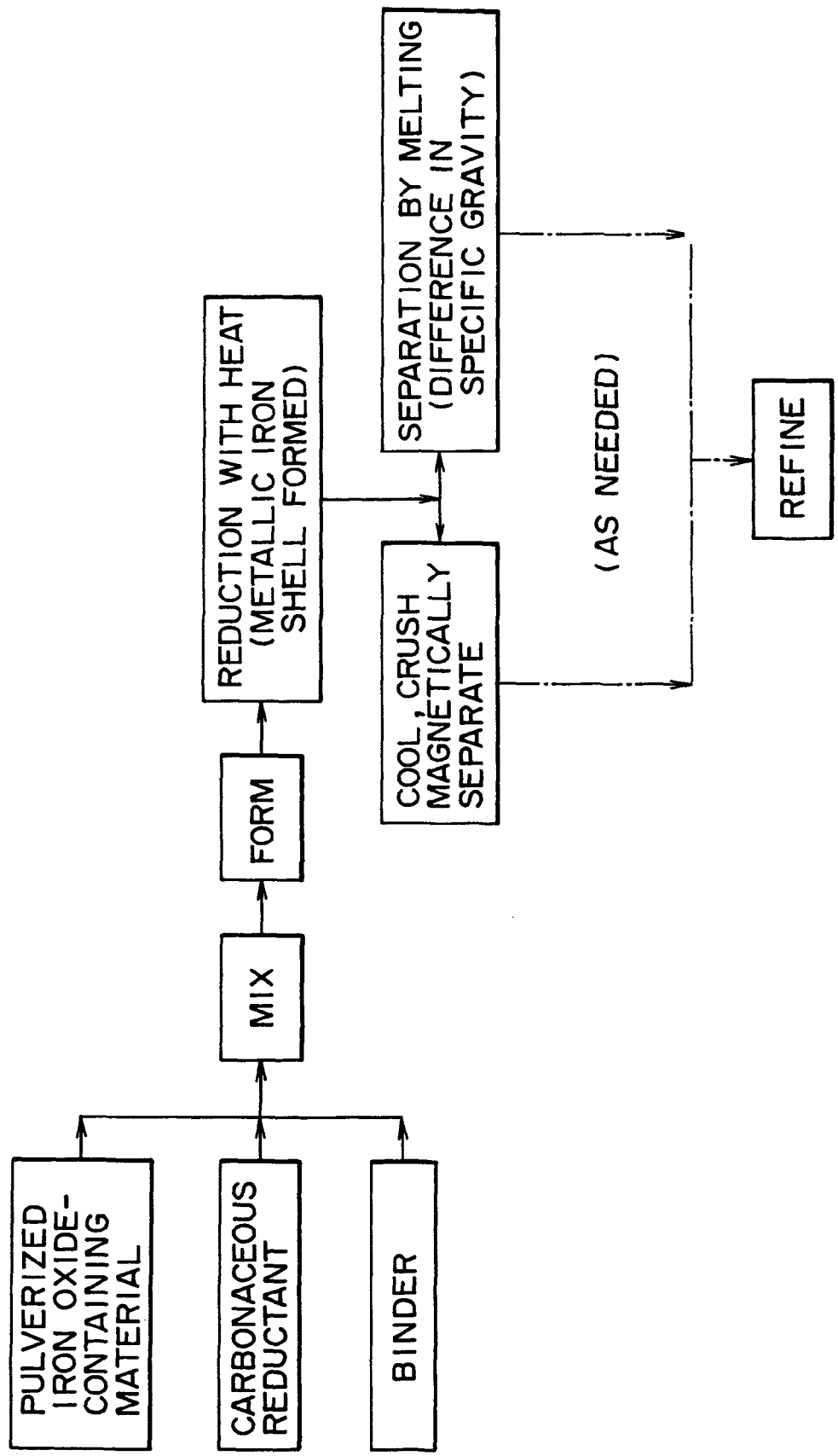
FIG. 8 is a schematic flow chart illustrating a reducing iron-making process according to an embodiment of the present invention.

FIG. 8 shows a flow chart illustrating an embodiment of the present invention. Pulverized iron oxide-containing material and pulverized carbonaceous reductant, together with binder, are mixed and formed into pellets or other forms of compacts. The thus formed pellets or the like are subjected to reduction through the application of heat at a temperature of not less than 1400° C. in a furnace. During the reducing step, a metallic iron shell is formed during the incipient stage of reduction, and then a reducing reaction progresses within the shell while molten slag aggregates within the shell. At the separating step, reduced masses are chilled to solidify, and then the resulting solidified masses are crushed, followed by collection of metallic iron through magnetic separation or the like. Alternatively, heating may be further continued to melt metallic iron so as to separate molten metallic iron from molten slag utilizing a difference in the specific gravity between them. If needed, the collected metallic iron may be refined to remove impurities such as sulfur and phosphorus and in addition, the carbon content of the metallic iron can be adjusted.

The above-described method of making metallic iron will next be described by way of embodiment. The method and apparatus of the present invention may be embodied in an industrial scale as described below.

Embodiment 2

In a method of making metallic iron according to Embodiment 2 of the present invention, a granular or agglomerate compact (hereinafter may be referred to as a compact) of iron oxide which contains a carbonaceous reductant is reduced through the application of heat, thereby making metallic iron. Specifically, the above-mentioned compact is reduced through the application of heat while being conveyed in a horizontal direction. In the course of this reduction, a shell composed of metallic iron is generated and grown, and slag aggregates inside the shell. This reduction is continued until substantially no iron oxide is present inside the shell. Subsequently, the compact in the form of the shell with a slag aggregate contained inside is discharged from the end portion of a conveying member into the subsequent melting process, in which the shell and the slag aggregate are melted, followed by separation into molten slag and molten iron.

Since a carbonaceous reductant is contained in a compact, reduction advances within the compact itself, thereby generating metallic iron (shell) and slag (inside the shell). The resulting substance is melted, followed by separation into molten iron and molten slag through the utilization of difference in specific gravity therebetween.

The amount of a carbonaceous reductant contained in the compact must be at least an amount required for reducing iron oxide, preferably plus an amount required for carburizing reduced iron, so that generation of reduced iron (metallic iron) can be accompanied by carburization. Solid (unmolten) reduced iron, composing a shell, has a porous form and thus is likely to be re-oxidized. This re-oxidization can be prevented by the presence of the carbonaceous reductant in the compact more than the above-described "amount required for reducing source iron oxide+amount required for carburizing reduced iron." This is because the CO gas generated from the compact establishes a non-oxidizing atmosphere around the compact. That is, the compact most preferably contains the carbonaceous reductant in "amount required for reducing source iron oxide+amount required for carburizing reduced iron+amount of loss associated with oxidation."

Furthermore, in Embodiment 2, a carbonaceous reductant is preferably additionally supplied while the compact is being conveyed in a horizontal direction and reduced through the application of heat.

In the above-described process, a carbonaceous reductant is previously contained in the compact in "amount required for reducing source iron oxide" plus "amount required for carburizing reduced iron+amount of loss associated with oxidation." However, the carbonaceous reductant may be contained in the compact in "amount required for reducing source iron oxide," and the carbonaceous reductant may be additionally supplied from outside in "amount required for carburizing reduced iron+amount of loss associated with oxidation" during reduction through the application of heat. Alternatively, the carbonaceous reductant may be contained in the compact in "amount required for reducing source iron oxide+amount required for carburizing reduced iron," and the carbonaceous reductant may be additionally supplied from outside in "amount of loss associated with oxidation" during reduction through the application of heat. In such a manner, the carbonaceous reductant may be additionally supplied to compensate a shortage. In any of these cases, the carbonaceous reductant in "amount required for reducing source iron oxide" allows a metallic iron shell to be generated in a good manner while slag aggregates inside the shell.

Through the use of a powdery carbonaceous reductant, the powdery carbonaceous reductant may be attached to the compact surface, thereby preventing the compacts from sintering together to become a relatively large agglomerate or sinteringly adhering to a furnace wall, and thus facilitating the handling of the compacts.

A carbonaceous reductant in "amount required for carburizing reduced iron" or "amount of loss associated with oxidation" may be additionally supplied while metallic iron (reduced iron) is being melted. In this case, carburization advances during the melting process, and the CO gas generated from the carbonaceous reductant maintains a non-oxidizing atmosphere around the compact, thereby preventing metallic iron from being re-oxidized.

An apparatus of making metallic iron according to Embodiment 2 implements the above-described method of making metallic iron. That is, there is provided an apparatus of making metallic iron by reducing a granular or agglomerate compact of iron oxide which contains a carbonaceous reductant, comprising: a thermal reduction apparatus having a conveying member for conveying the compact in a horizontal direction and a thermal reduction mechanism for heating the compact; a melting apparatus having a melting mechanism for melting, through the application of heat, the compact which is discharged from the conveyance end portion of the conveying member in the thermal reduction apparatus; and a separator, disposed subsequent to the melting apparatus, for separating molten slag and molten iron one from the other.

Through the use of the apparatus of Embodiment 2, molten iron can be continuously made from the compacts.

Further, in Embodiment 2, the conveying member for conveying the compact in a horizontal direction preferably employs an endless belt system and has a hearth on which the compact is placed.

Also, in Embodiment 2, the hearth preferably has separating members, arranged thereon at certain intervals, for preventing the compacts from adhering together. Examples of the separating members include plate-shaped refractories. Through employment of the separating members, the compacts can be prevented from sintering together to become a relatively large agglomerate, thereby facilitating the handling of the compacts.

Furthermore, the separating member is more preferably made of a desulfurizer. In this case, the separating member (a desulfurizer) is constructed to be readily separable from the hearth, so that the desulfurizer, together with the reduced compact, is charged into the melting apparatus. Therefore, desulfurization can be performed in the melting apparatus. The separating member made of a desulfurizer may be, for example, plate-shaped or in the form of a heap of powder.

A powdery desulfurizer may be used which is attached to the surface of the compact. This prevents the compacts from sintering together to become a relatively large agglomerate or sinteringly adhering to a furnace wall. In addition, since the powdery desulfurizer adhering to the compact is charged into the melting apparatus, desulfurization can be performed within the melting apparatus. Examples of such a desulfurizer include limestone.

In Embodiment 2, the melting apparatus preferably has a sloped floor, so that the compacts are melted through the application of heat while tumbling or sliding on the sloped floor.

Through the employment of such a sloped floor, the compacts smoothly move within the melting apparatus toward the subsequent separator. As the compacts move downward on the sloped floor, their degrees of melting increase and become substantially uniform (no mixed presence of the compacts of different degrees of melting), thereby efficiently melting the compacts.

Embodiment 2 will next be described in detail with reference to FIG. 9.

Figure 9:
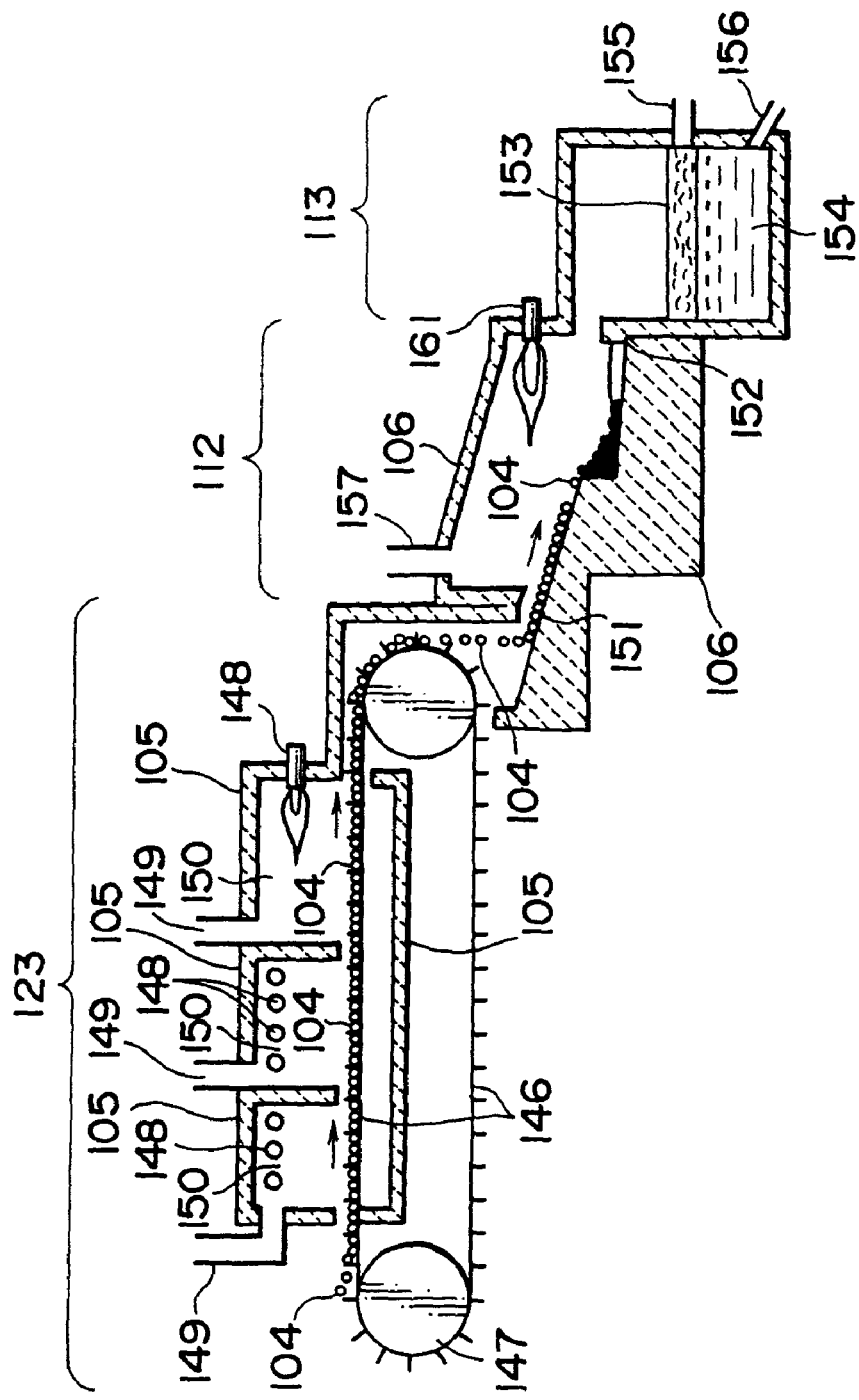
FIG. 9 is a schematic cross-sectional view showing an embodiment 2 of an apparatus for making metallic iron according to the present invention.

FIG. 9 is a schematic sectional view showing Embodiment 2 of a metallic iron-making apparatus according to the present invention.

The metallic iron-making apparatus has a thermal reduction apparatus 123, a melting apparatus 112, and a separator 113. The thermal reduction apparatus 123 has, as a conveying member, hearths 146 for placing compacts 104 thereon and a roller 147 for horizontally moving the hearth 146. This conveying member employs an endless belt system in which the pallet type hearths 146 are mounted on a belt conveyor, and the roller 147 is rotated by an external drive unit (not shown). The thermal reduction apparatus 123 has, as a thermal reduction mechanism, a reducing burner 148 for heating the interior of thermal reduction furnaces 150 enclosed by furnace walls 105 made of refractory to a predetermined temperature. The hearths 146 carrying the compacts 104 pass through the interior of the thermal reduction furnaces 150, thereby horizontally conveying the compacts 104. As shown in FIG. 9, three thermal reduction furnaces 150 are provided, each being able to be regulated to a desired temperature in accordance with a stage of reduction.

The thermal reduction apparatus 123 is followed by a melting apparatus 112, located at an end of conveyance on the hearths 146 (downstream of the conveying member). The melting apparatus 112 has, as a melting mechanism, a melting burner 161 for heating the interior of the melting apparatus 112 enclosed by a furnace wall 106 made of refractory. The melting apparatus 112 also has a sloped floor 151 for leading the compacts 104 to the next process (separator 113). A weir 152 is located between the melting apparatus 112 and the following separator 113. The separator 113 collects molten iron 154 and molten slag 153. The separator 113 has a slag outlet 155 and a molten iron outlet 156.

The thermal reduction furnaces 150 and the melting apparatus 112 have exhaust gas outlets 149 and 157, respectively.

Next, a process of making metallic iron will be described with reference to FIG. 9.

A pulverized mixture, composed of a carbonaceous reductant such as coal or the like and iron oxide such as iron ore or the like, is compacted to grains, for example. The thus-formed compact contains the carbonaceous reluctant in "amount required for reducing source iron oxide+amount required for carburizing reduced iron+amount of loss associated with oxidation."

The compacts 104 are placed onto the hearths 146 at the entrance (at the left of FIG. 9) of the thermal reduction apparatus 123 and then conveyed through the thermal reduction furnaces 150 one after the other (toward the right of FIG. 9). The internal temperature of the thermal reduction furnaces 150 is regulated by adjusting flame intensity of the reducing burner 148 so as to be less than a melting temperature of a metallic iron shell to be generated and not less than a melting temperature of slag to be generated. Through this application of heat, the compacts 104 are reduced.

In this thermal reduction process, reduction first advances at the peripheral portion of the compact 104, thereby forming a shell composed of metallic iron. Subsequently, through reduction by carbon monoxide, which is generated inside the shell from the carbonaceous reductant itself and through pyrolization of the carbonaceous reductant, a reducing reaction of iron oxide efficiently advances inside the shell. Accordingly, generated metallic iron aggregates to grow the shell, and generated slag also fuses to aggregate. As a result, in this thermal reduction process, a metallization ratio considerably increases, and the amount of iron oxide mixed into the slag considerably decreases.

The above-described reduction continues until substantially no iron oxide is present within the compact 104. The moving speed of the hearths 146 is adjusted in accordance with time required for this reduction. Since the amount of iron oxide mixed into the slag can be reduced through sufficient execution of reduction, the refractory (furnace wall) of the subsequent melting apparatus 112 can be prevented from being damaged by iron oxide when the compacts 104 are melted in the melting apparatus 112. The length of the thermal reduction furnace 150, through which the hearths 146 move, may be determined based on time required for reduction and the moving speed of the hearths 146.

As previously described, during reduction within the thermal reduction furnaces 150, the carbonaceous reductant contained in the compact 104 carburizes reduced iron, and the CO gas generated from the compact 104 establishes a non-oxidizing atmosphere around the compact 104, thereby preventing reduced iron from again being oxidized.

Upon substantial end of reduction, the compact 104 is composed of the metallic iron shell and a slag aggregate inside the shell and conveyed on the moving hearth 146 to the melting apparatus 112 while at least the shell is in a solid state. In the melting apparatus 112, tumbling or sliding downward on the sloped floor 151 (toward the separator 113), the compacts 104 are exposed to heat to melt. The interior of the melting apparatus 112 is set to a temperature for melting not only the slag but also the shell.

Even when a small amount of unreduced portion remains in the compact 104 led into the melting apparatus 112 (reduction is performed within the thermal reduction furnace 150 until substantially no iron oxide is present in the metallic iron shell, but iron oxide may remain in an amount of not more than 5% by weight or not more than 2% by weight in some cases), such an unreduced portion is reduced through the application of heat during the melting process. In this case, the melting apparatus 112 may be replenished with a carbonaceous reductant.

The melting compacts 104 stay behind the weir 152, and a molten substance overflows the weir 152 to be collected in the separator 113.

Since the molten slag 153 and the molten iron 154 are different in specific gravity, they separate one from the other in the separator 113 such that the molten slag 153 collects on the molten iron 154 to form two layers. The thus separated slag 153 is released from the slag outlet 155 while the molten iron 154 is released from the molten iron outlet 156.

As described above, highly reduced metallic iron can be efficiently obtained in the form of molten iron, with a metallization ratio of not less than 95%, or in some cases of not less than 98%. Furthermore, as a result of highly advanced reduction of iron oxide in the thermal reduction process, the amount of iron oxide mixed into the accompanying molten slag is significantly small. Therefore, the refractory of the melting apparatus 112 can accordingly be prevented from damagingly being melted by iron oxide mixed into the molten slag.

The separator 113 may preferably be provided with a heating burner or an electric heating apparatus for further heating the molten slag 153 and the molten iron 154 to a higher temperature to thereby increase their fluidity, so that the molten slag 153 and the molten iron 154 can be more readily separated one from the other, thereby facilitating their separate release.

Since an exhaust gas discharged from the exhaust gas outlets 149 and 157 has a high temperature and contains combustible gas, the exhaust gas may be utilized as a fuel gas to be fed to the burners 148 and 161. The exhaust gas may also be used as a heat source for drying or preheating the compacts 104 or for preheating fuel and combustion air. Also, the exhaust gas may be released without being utilized.

Embodiment 3

In a method of making metallic iron according to Embodiment 3 of the present invention, a granular or agglomerate compact (hereinafter may be referred to as a compact) of iron oxide which contains a carbonaceous reductant is reduced through the application of heat, thereby making metallic iron. Specifically, the above-mentioned compact is reduced through the application of heat while being placed on a horizontal surface. In the course of this reduction, a shell composed of metallic iron is generated and grown, and slag aggregates inside the shell. This reduction is continued until substantially no iron oxide is present inside the shell. Subsequently, the compact in the form of the shell with a slag aggregate contained inside is discharged from the horizontal surface, followed by further heating for melting. The resulting molten substance is separated into molten slag and molten iron.

As previously described, since a carbonaceous reductant is contained in a compact, reduction advances within the compact itself, thereby generating metallic iron (shell) and slag (inside the shell). The resulting substance is melted, followed by separation into molten iron and molten slag through the utilization of difference in specific gravity therebetween.

Like Embodiment 2, the amount of a carbonaceous reductant contained in the compact must be at least an amount required for reducing iron oxide, preferably plus an amount required for carburizing reduced iron. More preferably, the amount of a carbonaceous reductant is "amount required for reducing source iron oxide+amount required for carburizing reduced iron+amount of loss associated with oxidation."

Also, in Embodiment 3, a carbonaceous reductant is preferably additionally supplied while the compact, placed on a horizontal surface, is being reduced through the application of heat.

Further, like Embodiment 2, a carbonaceous reductant may be contained in the compact in "amount required for reducing source iron oxide," and the carbonaceous reductant may be additionally supplied from outside in "amount required for carburizing reduced iron+amount of loss associated with oxidation" during reduction through the application of heat. Alternatively, the carbonaceous reductant may be contained in the compact in "amount required for reducing source iron oxide+amount required for carburizing reduced iron," and the carbonaceous reductant may be additionally supplied from outside in "amount of loss associated with oxidation" during reduction through the application of heat. In such a manner, the carbonaceous reductant may be additionally supplied to compensate a shortage.

Further, like Embodiment 2, through the use of a powdery carbonaceous reductant, the powdery carbonaceous reductant may be attached to the compact surface, thereby preventing the compacts from sintering together to become a relatively large agglomerate or sinteringly adhering to a furnace wall, and thus facilitating the handling of the compacts.

Further, as previously described, a carbonaceous reductant in "amount required for carburizing reduced iron" or "amount of loss associated with oxidation" may be additionally supplied while metallic iron (reduced iron) is being melted. In this case, carburization advances during the melting process, and the CO gas generated from the carbonaceous reductant maintains a non-oxidizing atmosphere around the compact, thereby preventing metallic iron from being re-oxidized.

An apparatus of making metallic iron according to Embodiment 3 implements the above-described method of making metallic iron. That is, there is provided an apparatus of making metallic iron by reducing a granular or agglomerate compact of iron oxide which contains a carbonaceous reductant, comprising: a thermal reduction apparatus having a feeding member for intermittently feeding the compact in while carrying the compact on a horizontal surface, a discharging member capable of discharging the compact from the feeding member, and a thermal reduction mechanism for heating the compact; a melting apparatus having a melting mechanism for melting, through the application of heat, the compact which is discharged from the thermal reduction apparatus; and a separator, disposed subsequent to the melting apparatus, for separating molten slag and molten iron one from the other.

Through the use of the apparatus of Embodiment 3, molten iron can be continuously made from the compacts.

Further, in Embodiment 3, the discharging member is preferably a tilting member for alternating the position of the feeding member between a horizontal position and a sloped position. Alternatively, the discharging member is preferably a pushing member for pushing out the compact from the feeding member. The feeding member is also preferably a tilting member and has a pushing member. Through the employment of a tilting member or pushing member as the discharging member, the compacts can smoothly be led into the melting apparatus even when the compacts sinter together to become a relatively large agglomerate during reduction through the application of heat.

Like Embodiment 2, in Embodiment 3, an iron support may be placed on the feeding member, so that the iron support, together with the compacts, can be discharged. Also, in this case, the compacts can be smoothly led into the melting apparatus even when the compacts sinter together to become a relatively large agglomerate or adhere to the iron support during reduction through the application of heat.

Furthermore, the feeding member preferably has separating members, arranged thereon at certain intervals, for preventing the compacts from adhering together. Examples of the separating members include plate-shaped refractories. Through employment of the separating members, the compacts can be prevented from sintering together to become a relatively large agglomerate, thereby facilitating the handling of the compacts.

Further, as previously described, the separating member is more preferably made of a desulfurizer. In this case, the separating member (a desulfurizer) is constructed to be readily separable from the hearth, so that the desulfurizer, together with the reduced compact, is charged into the melting apparatus. Therefore, desulfurization can be performed in the melting apparatus. The separating member made of a desulfurizer may be, for example, plate-shaped or in the form of a heap of powder.

A powdery desulfurizer may be used which is attached to the surface of the compact. This prevents the compacts from sintering together to become a relatively large agglomerate or sinteringly adhering to a furnace wall. In addition, since the powdery desulfurizer adhering to the compact is charged into the melting apparatus, desulfurization can be performed within the melting apparatus. Examples of such a desulfurizer include limestone.

In Embodiment 3, the melting apparatus preferably has a sloped floor, so that the compacts are melted through the application of heat while tumbling or sliding on the sloped floor.

Through the employment of such a sloped floor, the compacts smoothly move within the melting apparatus toward the subsequent separator. As the compacts move downward on the sloped floor, their degrees of melting gradually increase, and thus the compacts of different degrees of melting are not mixedly present (the degrees of melting are substantially uniform at each position on the sloped floor), thereby efficiently melting the compacts.

Embodiment 3 will next be described in detail with reference to FIGS. 10 and 11.

Figure 10:
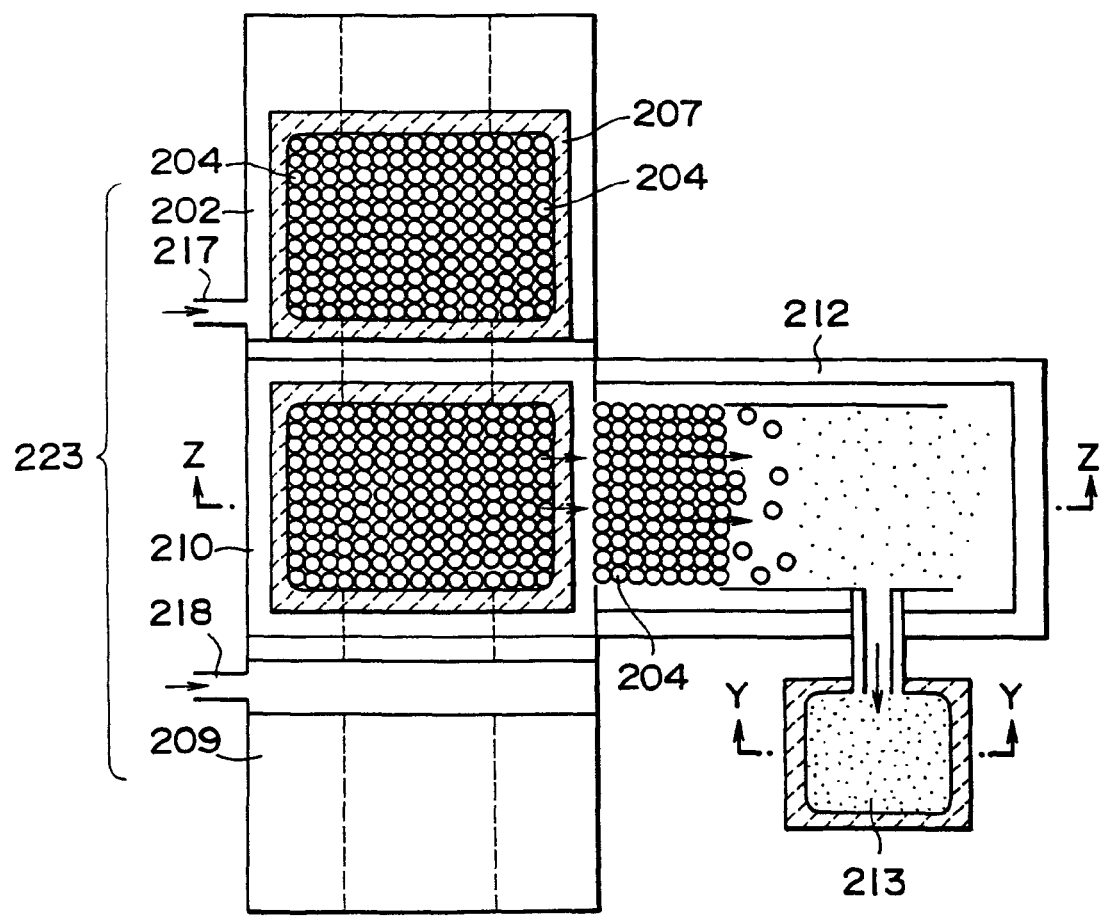
FIG. 10 is a schematic top sectional view showing an embodiment 3 of an apparatus for making metallic iron according to the present invention.
Figure 11:
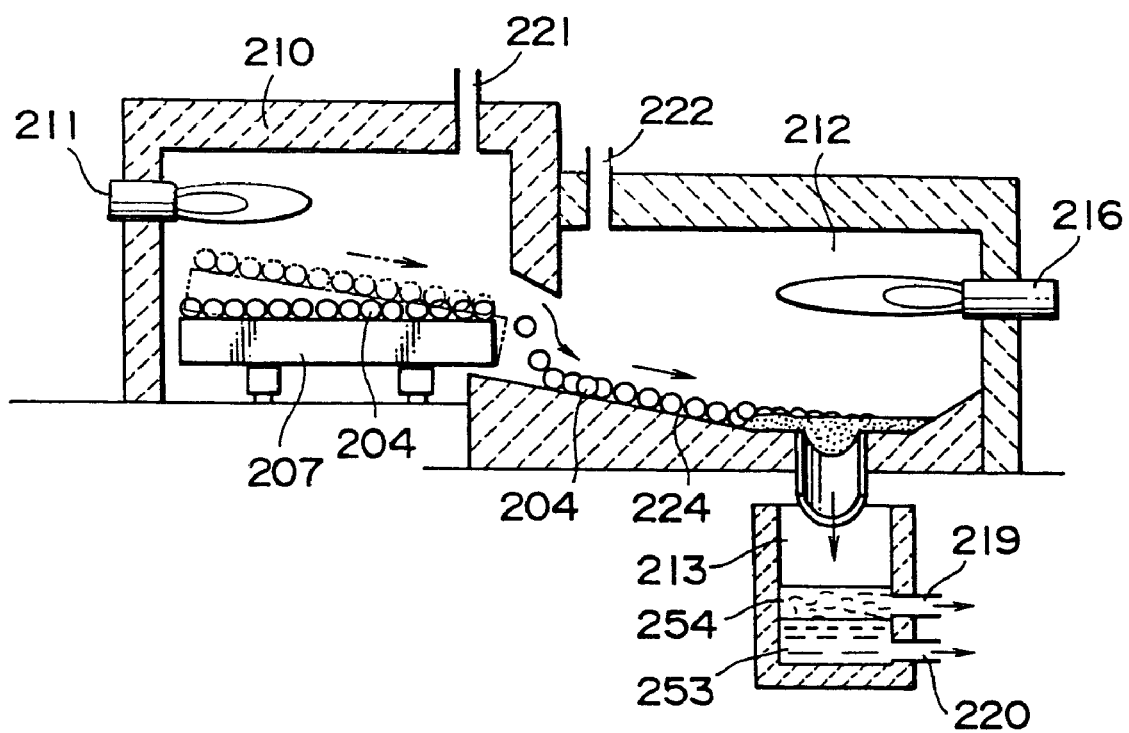
FIG. 11 is a schematic cross-sectional view taken along lines Z-Z and Y-Y of FIG. 10.

FIGS. 10 and 11 show Embodiment 3 of a metallic iron-making apparatus according to the present invention, wherein FIG. 10 shows a horizontal section of the apparatus as viewed from above, and FIG. 11 shows a sectional view of the apparatus taken along lines Z-Z and Y-Y of FIG. 10.

The apparatus of making metallic iron has a thermal reduction apparatus 223, a melting apparatus 212, and a separator 213. The thermal reduction apparatus 223 is composed of preparatory compact chambers 202 and 209 and a thermal reduction furnace 210. The thermal reduction apparatus 223 has a cart (feeding member) 207 to carry the compacts 204, and the cart 207 moves between the preparatory compact chambers 202 and 209 and the thermal reduction furnace 210. The cart 207 has a tilting member (not shown) for alternating the position of a compact-carrying plane (hearth) between a horizontal position and a sloped position. The preparatory compact chambers 202 and 209 have feed ports 217 and 218, respectively, for feeding the compacts 204 therethrough from the exterior of the preparatory compact chambers 202 and 209. The thermal reduction furnace 210 has a reducing burner 211 (thermal reduction mechanism) and an exhaust gas outlet 221 for releasing a generated exhaust gas.

The melting apparatus 212 is located on the outlet side of the thermal reduction furnace 210 and has a melting burner 216 (heat-melting mechanism) and an exhaust gas outlet 222. The melting apparatus 212 also has a sloped floor 224, which leads the compacts 204 toward the next process (separator 213).

The separator 213, following the melting apparatus 212, collects molten slag 254 and molten iron 253 and has a slag outlet 219 and a molten iron outlet 220.

Next, a process of making metallic iron will be described with reference to FIGS. 10 and 11.

A pulverized mixture, composed of a carbonaceous reductant such as coal or the like and iron oxide such as iron ore or the like, is compacted in advance. As in the above-described Embodiment 2, The thus-formed compact contains the carbonaceous reductant in "amount required for reducing source iron oxide+amount required for carburizing reduced iron+ amount of loss associated with oxidation." Furthermore, in Embodiment 3, a powdery desulfurizer such as powdery limestone or the like adheres to the compact surface.

The compacts 204 are fed into the preparatory compact chamber 202 through the feed port 217 to be placed on the cart 207 (in a horizontal position). The cart 207 carrying the compacts 204 moves into the thermal reduction furnace 210. The compacts 204 are reduced through the application of heat within the thermal reduction furnace 210, whose maximum temperature is regulated by the reducing burner 211 so as to be not less than the melting point of generated slag and not more than the melting point of a metallic iron shell. During this reduction, the cart 207 maintains its horizontal position, i.e. the compacts 204 are reduced through the application of heat while being placed on a horizontal plane Hearth).

In this thermal reduction process, reduction first advances at the peripheral portion of the compact 204, thereby forming a shell composed of metallic iron. Subsequently, through reduction by carbon monoxide, which is generated inside the shell from the carbonaceous reductant itself and through pyrolization of the carbonaceous reductant, a reducing reaction of iron oxide efficiently advances inside the shell. Accordingly, generated metallic iron aggregates to grow the shell, and generated slag also fuses to aggregate. That is, as reduction advances, the compact 204 generates and grows the metallic iron shell while slag aggregates inside the shell. As a result, in this thermal reduction process, a metallization ratio considerably increases, and the amount of iron oxide mixed into the slag considerably decreases.

The above-described reduction continues until substantially no iron oxide is present within the compact 204. Since the amount of iron oxide mixed into the slag can be reduced through sufficient execution of reduction, the refractory (furnace wall) of the subsequent melting apparatus 212 can be prevented from being damaged by iron oxide when the compacts 204 are melted in the melting apparatus 212.

Because of adhesion of a powdery desulfurizer to the surface of the compacts 204 as previously described, the compacts 204 are prevented from sintering together to become a relatively large agglomerate or sinteringly adhering to the furnace wall during this reduction.

Furthermore, as previously described, during reduction within the thermal reduction furnaces 250, the carbonaceous reductant contained in the compact 204 carburizes reduced iron, and the CO gas generated from the compact 204 establishes a non-oxidizing atmosphere around the compact 204, thereby preventing reduced iron from again being oxidized.

Upon substantial end of reduction, the compact 204 is composed of the metallic iron shell and a slag aggregate inside the shell. At this stage, the cart 207 is sloped by the tilting member (as represented by the dotted line of FIG. 11). Since at least the shell of the compact 204 is in a solid state, the compacts 204 move downward on the sloped hearth of the cart 207 to be discharged from the thermal reduction furnace 210 into the melting apparatus 212. The emptied cart 207 returns to the preparatory compact chamber 202 to be fed again with the compacts 204 through the feed port 217.

In the present invention, since the cart 207 is tilted for leading the compacts 204 from the thermal reduction furnace 210 to the melting apparatus 212, even when no powdering desulfurizer is employed with a resultant formation of relatively large agglomerates of the compacts 204 which have been subjected to reduction through the application of heat, the thus-agglomerated compacts 204 can be smoothly led into the melting apparatus 212.

Since the interior of the melting apparatus 212 is set to a temperature for melting not only the slag but also the metallic iron shell, the compacts 204 melt within the melting apparatus 212. Rolling or sliding downward on the sloped floor 224 (toward the separator 213), the compacts 204 are exposed to heat to melt. The resulting molten substance is led into the separator 213.

Even when a small amount of unreduced portion remains in the compact 204 led into the melting apparatus 212 (reduction is performed within the thermal reduction furnace 250 until substantially no iron oxide is present in the metallic iron shell, but iron oxide may remain in an amount of not more than 5% by weight or not more than 2% by weight in some cases), such an unreduced portion is reduced through the application of heat during the melting process. In this case, the melting apparatus 212 may be replenished with a carbonaceous reductant.

Since the molten slag 254 and the molten iron 253 are different in specific gravity, they separate one from the other in the separator 213 such that the molten slag 254 collects on the molten iron 253 to form two layers. The thus-separated slag 254 is released from the slag outlet 219 while the molten iron 253 is released from the molten iron outlet 220.

As described above, highly reduced metallic iron can be efficiently obtained in the form of molten iron, with a metallization ratio of not less than 95%, or in some cases of not less than 98%. Furthermore, as a result of highly advanced reduction of iron oxide in the thermal reduction process, the amount of iron oxide mixed into the accompanying molten slag is significantly small. Therefore, the refractory of the melting apparatus 212 can accordingly be prevented from damagingly being melted by iron oxide mixed into the molten slag.

As in the aforementioned Embodiment 2, the separator 213 may preferably be provided with a heating burner or an electric heating apparatus for further heating the molten slag 254 and the molten iron 253 to a higher temperature to thereby increase their fluidity, so that the molten slag 254 and the molten iron 253 can be more readily separated one from the other, thereby more facilitating their separate release.

Since the thermal reduction apparatus 223 has also the preparatory compact chamber 209, the compacts 204 are also fed into the preparatory compact chamber 209 through the feed port 218 to be placed on the cart 207 (in a horizontal position). The cart carrying the compacts 204 moves into the thermal reduction furnace 210, where the compacts 204 are subjected reduction through the application of heat in the similar manner described above. The compacts 204 (carried on the cart 207) are intermittently led into the thermal reduction furnace 210 from the preparatory compact chambers 202 and 209 in an alternating manner. While the compacts 204 fed from either of the preparatory compact chambers 209 and 202 is being reduced, the compacts 204 may be fed into the other preparatory compact chamber 209 or 202, thereby reducing time required for feeding and reducing the compacts 204.

Since an exhaust gas discharged from the exhaust gas outlets 221 and 222 has a high temperature and contains combustible gas, the exhaust gas may be utilized as a fuel gas to be fed to the burners 211 and 216. The exhaust gas may also be used as a heat source for drying or preheating the compacts 204 or for preheating fuel and combustion air. Also, the exhaust gas may be released without being utilized.

In the apparatus of making metallic iron of FIGS. 10 and 11, the thermal reduction apparatus 223 uses a tilting member, as a discharging member, which changes the position of the cart 207 (a feeding member) from a horizontal position to a sloped position to thereby discharge the compacts 204 from the thermal reduction apparatus 223 into the melting apparatus 212. The discharging member is not limited thereto, but may be, for example, a pushing member for pushing out the compacts 204 on the cart 207 to thereby discharge the compacts 204 from the thermal reduction apparatus 223. Alternatively, an iron support may be placed on the cart 207, and the compacts 204 may be placed on the support, so that the compacts 204, together with the iron support, may be discharged from the thermal reduction apparatus 223. Such a method that the compacts 204 are discharged by the pushing member or together with the iron support can smoothly lead the compacts 204 into the melting apparatus 212 even when the compacts 204 agglomerate to a considerably large size.

Embodiment 4

In Embodiment 4, a granular or agglomerate compact (hereinafter may be referred to as a compact) of iron oxide which contains a carbonaceous reductant is reduced through the application of heat, thereby making metallic iron. Specifically, the above-mentioned compact is rolled to be uniformly heated so as to be efficiently be reduced. In the course of this reduction, a shell composed of metallic iron is generated and grown, and slag aggregates inside the shell. This reduction is continued until substantially no iron oxide is present inside the shell. Subsequently, the compact in the form of the shell with a slag aggregate contained inside is further heated to be melted, followed by separation into molten slag and molten iron. Since the compacts are rolled, the compacts are prevented from sintering together to become a relatively large agglomerate or sinteringly adhering to a furnace wall during reduction through the application of heat.

Figure 12:
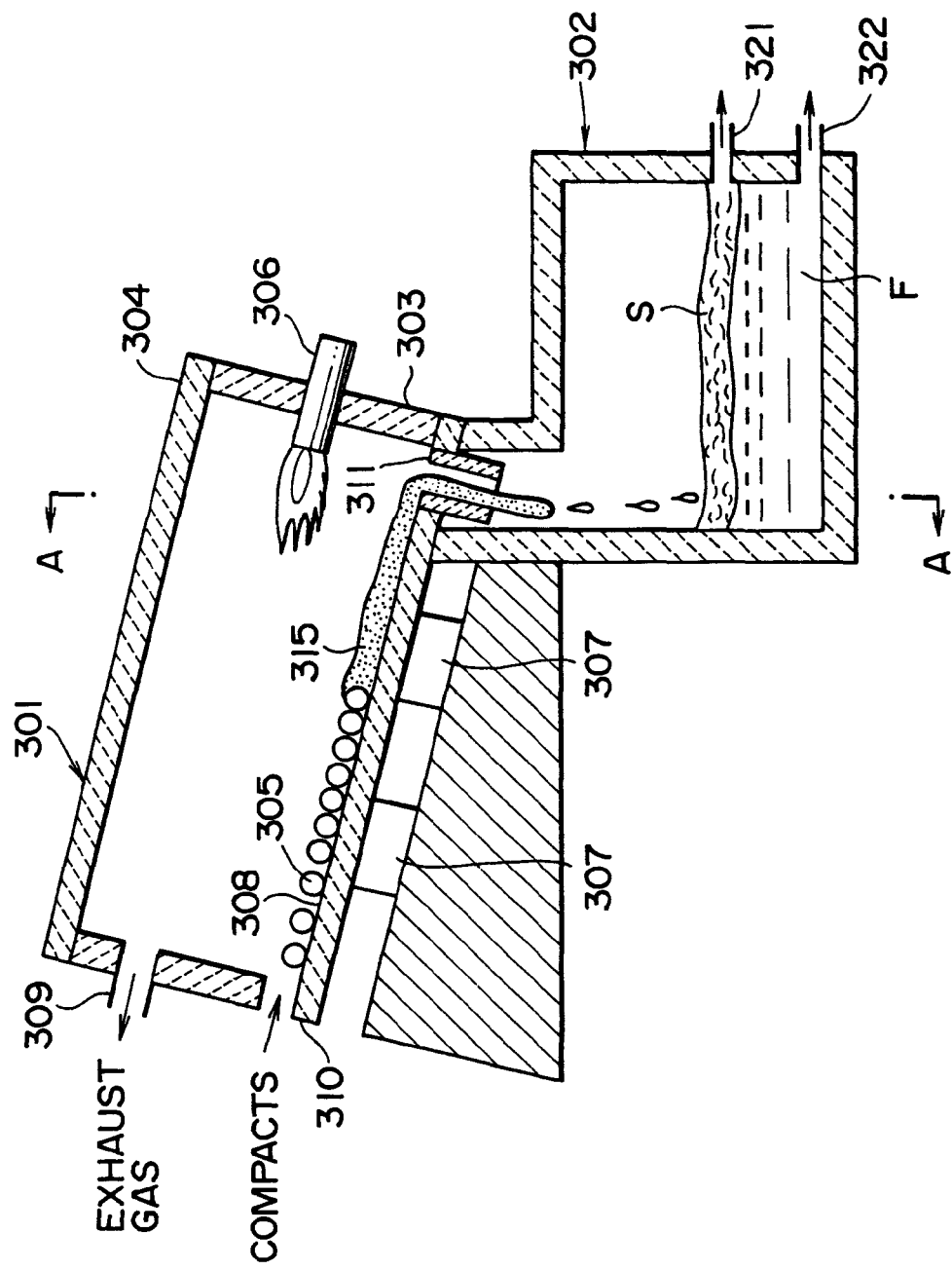
FIG. 12 is a schematic cross-sectional view showing an embodiment 4 of an apparatus for making metallic iron according to the present invention.

FIG. 12 is a schematic sectional view showing an embodiment 4 of an apparatus of making metallic iron according to the present invention. FIG. 13 shows a sectional view of the apparatus of making metallic iron taken along line A-A of FIG. 12. In FIGS. 13 and 12, reference numeral 301 denotes a thermal reduction-melting apparatus, and reference numeral 302 denotes a separator. The thermal reduction-melting apparatus 301 and the separator 302 are constructed of or lined with refractory.

The thermal reduction-melting apparatus 301 is composed of a channel-like member 303 and a cover member 304. The channel-like member 303 has an arc-shaped inner surface, i.e. a sloped surface for tumbling 308 and is sloped along the length of a channel (in a right-left direction of FIG. 12). The channel-like member 303 is supported by support rollers 307 and rocks in the direction of arrow B. Therefore, the sloped surface for tumbling 308 rocks accordingly. Rolling on the rocking sloped surface for tumbling 308, compacts 305 gradually move downward along the direction of inclination (toward the right of FIG. 12). A burner 306 serving as a thermal reduction-melting member is provided in the thermal reduction-melting apparatus 301 on the bottom side of the slope (at the right-hand side of FIG. 12). The burner 306 establishes a thermal reduction atmosphere (the left-hand region of FIG. 12) and a melting atmosphere (the right-hand region of FIG. 12) within the thermal reduction-melting apparatus 301. In FIG. 12, reference numeral 309 denotes an exhaust gas outlet for releasing an exhaust gas generated by the burner 306.

The compacts 305 are formed by compacting a mixture, composed of a carbonaceous reductant such as coal or the like and iron oxide such as iron ore or the like. The thus-prepared compacts 305 are charged into the thermal reduction-melting apparatus 301 through a feed port 310. As described above, the compacts 305 gradually move downward along the direction of inclination (toward the right of FIG. 12) while tumbling, during which the compacts 305 are reduced and melted through the application of heat of the burner 306. A resulting molten substance 315 is discharged through a discharging section 311, formed at the bottom end portion of the sloped surface for tumbling 308, into the separator 302. The internal temperature of the thermal reduction-melting apparatus 301 is regulated such that the thermal reduction region has a temperature of less than the melting point of a generated metallic iron shell and not less than the melting point of generated slag and such that the melting region has a temperature at which both reduced metallic iron and the generated slag melt.

In a thermal reduction process within the thermal reduction-melting apparatus 301, reduction first advances at the peripheral portion of the compact 305, thereby forming a shell composed of metallic iron. Subsequently, through reduction by carbon monoxide, which is generated inside the shell from the carbonaceous reductant itself and through pyrolization of the carbonaceous reductant, a reducing reaction of iron oxide efficiently advances inside the shell. Accordingly, generated metallic iron aggregates to grow the shell, and generated slag also fuses to aggregate. As a result, in this thermal reduction process, a metallization ratio considerably increases, and the amount of iron oxide mixed into the slag considerably decreases.

The above-described reduction continues until substantially no iron oxide is present within the compact 305. The moving speed (lowering speed) of the compacts 305 is adjusted in accordance with time required for this reduction. The moving speed of the compacts 305 may be effectively adjusted through the adjustment of angle of inclination of the sloped surface for tumbling 308 or through the formation of a plurality of elongated bumps on the sloped surface for tumbling 308 in a direction perpendicular to the direction of inclination of the sloped surface for tumbling 308. The compacts 305, which have been reduced and thus are each composed of a metallic iron shell and a slag aggregate inside the shell, are melted through the application of high-temperature heat in the downstream region of the thermal reduction-melting apparatus 301, as previously described.

In the separator 302, since molten slag S, having a smaller specific gravity, separately floats on the surface of molten iron F, separated molten slag S may be released through a slag outlet 321 while molten iron F may be released through a molten iron outlet 322.

In the above-described Embodiment 4, the compacts 305 are reduced and melted through the application of heat within the thermal reduction-melting apparatus 301 having the sloped surface for tumbling 308. Alternatively, the thermal reduction-melting apparatus 301 may be constructed as a thermal reduction apparatus wherein the burner 306 is only used as a thermal reduction member for reducing the compacts 305 and the compacts 305 undergoes only reduction through the application of heat. In this case, the separator 302 may be provided with a burner, an electric heating apparatus or the like to thereby have functions of a melting apparatus, or a melting apparatus may be provided between the thermal reduction apparatus and the separator so as to perform melting within the separate melting apparatus. In addition, a plurality of the burners 306 may be provided such that some burners 306 are used to maintain a thermal reduction atmosphere while other burners 306 are used to maintain a melting atmosphere. The separator 302 may preferably be provided with a heating burner or an electric heating apparatus for further heating molten slag S and molten iron F to a higher temperature to thereby increase their fluidity, so that molten slag S and molten iron F can be more readily separated one from the other, thereby more facilitating their separate release.

In the above-described Embodiment 4, the sloped surface for tumbling 308 is provided so that the compacts 305 naturally move downward in the direction of inclination. The surface for tumbling is not limited to a sloped surface, but may be movably constructed such that it maintains a horizontal position during reduction of the compacts 305 and is sloped upon completion of reduction of the compacts 305. Alternatively, certain mechanical means may be provided to send the reduced compacts 305 to the separator side while the surface remains horizontal. The above-described sloped surface for tumbling 308 (or a horizontal surface for tumbling) is formed into an arc shape, but is not limited thereto. It may be formed into any shape, including a V shape and a U-shape, so long as the compacts 305 can roll thereon.

The amount of a carbonaceous reductant contained in the compact 305 must be at least an amount required for reducing iron oxide, preferably plus an amount required for carburizing reduced iron, so that generation of reduced iron can be accompanied by carburization. Solid (unmolten) reduced iron, composing a shell, has a porous form and thus is likely to be re-oxidized. This re-oxidization can be prevented through containment of an additional amount of the carbonaceous reductant in the compact 305 since the CO gas generated from the compact 305 establishes a non-oxidizing atmosphere around the compact 305. That is, the compact 305 most preferably contains the carbonaceous reductant in "amount required for reducing source iron oxide+amount required for carburizing reduced iron+amount of loss associated with oxidation."

Also, in Embodiment 4, a carbonaceous reductant is preferably additionally supplied while the compact is being rolled and reduced through the application of heat.

In the above-described proposal, a carbonaceous reductant is previously contained in the compact in "amount required for reducing source iron oxide+amount required for carburizing reduced iron+amount of loss associated with oxidation." However, like Embodiment 2 or the like, the carbonaceous reductant may be contained in the compact in "amount required for reducing source iron oxide," and the carbonaceous reductant may be additionally supplied from outside in "amount required for carburizing reduced iron+amount of loss associated with oxidation" during reduction through the application of beat. Alternatively, the carbonaceous reductant may be contained in the compact in "amount required for reducing source iron oxide+amount required for carburizing reduced iron," and the carbonaceous reductant may be additionally supplied from outside in "amount of loss associated with oxidation" during reduction through the application of heat. In such a manner, the carbonaceous reductant may be additionally supplied to compensate a shortage.

As previously described, through the use of a powdery carbonaceous reductant, the powdery carbonaceous reductant may be attached to the compact surface, thereby preventing the compacts from sintering together to become a relatively large agglomerate or sinteringly adhering to a furnace wall, and thus facilitating the handling of the compacts.

While metallic iron (reduced iron) is being melted, the thermal reduction-melting apparatus 301 may be replenished with a carbonaceous reductant to compensate a shortage of the carbonaceous reductant, so that the CO gas generated from the carbonaceous reductant maintains a non-oxidizing atmosphere around the compacts 305, thereby preventing metallic iron from again being oxidized. Thus, it is preferable that during the melting of metallic iron, a carbonaceous reductant be additionally fed in the amount of compensating a shortage or that the carbonaceous reductant is previously contained in the compact 305 in excess of a required amount, so that even when some iron oxide remains due to incomplete reduction in a reducing process, the remaining iron oxide can completely be reduced in a melting process.

According to the above description of Embodiment 4, the compacts 305 are not subjected to any treatment before they are charged into the thermal reduction-melting apparatus 301 (or a thermal reduction apparatus). In order to reduce the length of the surface of tumbling of the thermal reduction-melting apparatus 301 (i.e. the length in the direction of inclination in FIG. 12) to thereby shorten time required for reduction through the application of heat, the compacts 305 may be prereduced before they are charged into the thermal reduction-melting apparatus 301. In this case, a prereducing apparatus must be provided upstream of the thermal reduction-melting apparatus 301 (or a thermal reduction apparatus).

Embodiments 5 to 7

In Embodiments 5 to 7, a granular or agglomerate compact of iron oxide which contains a carbonaceous reductant is reduced through the application of heat, thereby making metallic iron. Specifically, the above-mentioned compact is reduced through the application of heat while falling downward. In the course of this reduction, a shell composed of metallic iron is generated and grown, and slag aggregates inside the shell. This reduction is continued until substantially no iron oxide is present inside the shell. The compact in the form of the shell with a slag aggregate contained inside is further heated to be melted in the course of the fall, followed by separation into molten slag and molten iron. Further, by adding a preceding process of continuously forming the granular compacts to the process of reduction through the application of heat, it becomes possible to continuously perform a series of processes of preparing granular compacts serving as material for metallic iron, reducing the compacts through the application of heat, and separating metallic iron generated through the reduction from slag.

In the above-described process of reduction through the application of heat, reduction, first, advances from the surface of the granular compact, thereby forming a shell composed of metallic iron. Subsequently, due to a reducing action of carbon monoxide generated from the carbonaceous reductant itself and through pyrolization of the carbonaceous reductant, the reducing reaction of CO with iron oxide efficiently advances inside the shell. Accordingly, generated metallic iron adheres together to aggregate while generated slag is melted to aggregate. As a result, in this thermal reduction process, a metallization ratio considerably increases, and the amount of iron oxide mixed into the slag considerably decreases.

In a section located underneath the section of reduction through the application of heat, further heating is performed to melt the metallic iron shell. The resulting molten substance falls into a separator located underneath, where molten iron and molten slag are separated one from the other due to their different specific gravities. Thus, highly reduced metallic iron can be efficiently obtained in the form of molten iron. Furthermore, since iron oxide is intensively reduced in the thermal reduction process, the amount of iron oxide mixed into the accompanying molten slag is significantly small. Therefore, the refractory of a melting apparatus can accordingly be prevented from damagingly being melted by iron oxide mixed into the molten slag.

Figure 14:
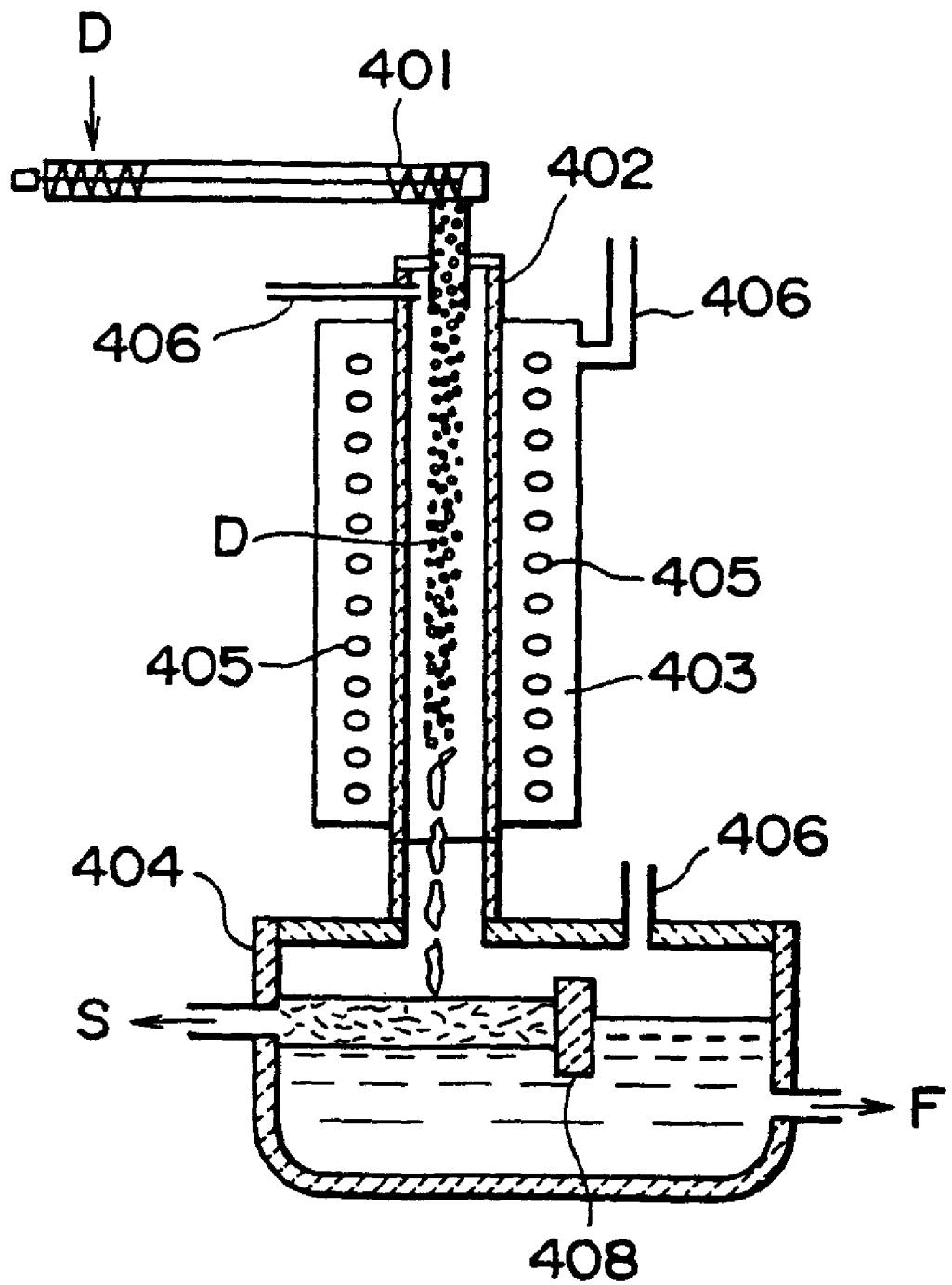
FIG. 14 is a schematic cross-sectional view showing an embodiment 5 of a method and apparatus for making metallic iron according to the present invention.

FIG. 14 shows a schematic sectional view of Embodiment 5 of the present invention, illustrating a typical method and apparatus for making metallic iron. In FIG. 14, reference numeral 401 denotes a screw-shaped conveying apparatus; numeral 402 denotes a reducing-melting furnace having a space of falling for conducting heating, reduction, and melting; numeral 403 denotes a heating section for indirectly heating the reducing-melting furnace 402 from outside; and numeral 404 denotes a separator furnace for receiving molten slag and molten metallic iron, falling from above, and for separating them one from the other. For use in this apparatus of making metallic iron, a mixture, composed of a carbonaceous reductant such as coal or the like and iron oxide such as iron ore or the like and, as needed, a binder, is compacted to grains, thereby forming granular compacts D. The granular compacts D are fed into the conveying apparatus 401, so that they are continuously charged from the tip portion of the conveying apparatus 401 into the top portion of the reducing-melting furnace 402.

In FIG. 14, the previously prepared granular compacts D are continuously charged into the reducing-melting furnace 402 through the use of the conveying apparatus 401. Alternatively, a continuous compacting apparatus such as a disk pelletizer may be installed upstream of the conveying apparatus 401, so that the granular compacts D are continuously prepared and fed to the reducing-melting furnace 402 via the conveying apparatus 401. This arrangement is particularly preferable since a series of processes of preparing, conveying, and reducing through the application of heat the granular compacts D can be continuously conducted.

The reducing-melting furnace 402 is indirectly heated by the heating section 403 provided therearound. While the charged granular compacts D are falling downward by their own weight within the reducing-melting furnace 402, reduction advances from the surface of each granular compact D, thereby forming a shell, composed mainly of metallic iron generated through reduction, on the surface. Carbon monoxide generated from a carbonaceous reductant and through pyrolization of the carbonaceous reductant establishes an intensive reducing atmosphere within the shell, thereby sharply accelerating reduction of iron oxide inside the shell. Therefore, by properly determining the length of the reducing-melting furnace 402 and a heating temperature in accordance with the falling speed of the granular compacts D, the intensive reducing atmosphere established within the metallic iron shell efficiently reduces iron oxide inside the shell, thereby obtaining a metallization ratio of not less than 95%, or in some cases of not less than 98%.

Slag, generated in the course of generation of metallic iron, melts inside the metallic iron shell of the granular compact D at a lower temperature than metallic iron does. The thus-molten slag and the metallic iron shell fuse together in a separated state. As the granular compact D falls further downward within the reducing-melting furnace 402 and is heated further, the metallic iron shell also melts. The molten metallic iron, together with the molten slag, falls into the separator furnace 404 located underneath. In the separator furnace 404, molten slag S having a smaller specific gravity separately floats on the surface of molten iron F. Thus, the molten slag S is released from the separator furnace 404 at a location in the vicinity of the surface of the molten iron F while the molten iron F is released from the bottom portion of the separator furnace 404.

In Embodiment 5, a submerged weir 408 is provided within the separator furnace 404. Due to difference in specific gravity between the molten slag S and the molten iron F, the molten slag S floats on the surface of the molten iron F on one side of the submerged weir 408 and is released from the separator furnace 404 at a location in the vicinity of the molten iron surface. The molten surface F flows under the submerged weir 408 to the other side of the submerged weir 408 (to the right-hand side of FIG. 14) and is released from the bottom portion of the separator surface 404. This arrangement more efficiently separates the molten iron F from the molten slag S.

In addition to the above-described arrangement in which the submerged weir 408 is provided so that a molten substance of the granular compacts D falls and accumulates on one side of the submerged weir 408, a heating arrangement may be employed for heating the molten slag S accumulated on that side of the submerged weir 408. In this case, even when the molten substance of the granular compacts D, with some portion being insufficiently reduced, falls into the separator furnace 404, the molten slag layer is again heated, thereby completing a reducing reaction. Accordingly, a metallization ratio is further improved.

In FIG. 14, reference numeral 406 denotes exhaust gas outlets. Exhaust gases may be released through the corresponding exhaust gas outlets 406 without any utilization thereof. However, since the exhaust gases have a high temperature and contain combustible gas, they may be utilized as fuel gases to be fed to burners 405 located at the heating section 403, resulting in a reduced fuel consumption associated with heating. In the above description, the reducing-melting furnace 402 is indirectly heated from outside. However, burners may be mounted inside the reducing-melting furnace 402 for directly heating the granular compacts D.

The present invention is desirably embodied such that while the granular compacts D are falling by their own weight within the reducing-melting furnace 402, reduction is substantially completed and such that the thus-reduced iron is melted at the lower portion of the reducing-melting furnace 402 and falls, in the molten state, into the separator furnace 404. To this end, in order to secure a sufficient residence time in accordance with the falling speed of the granular compacts D, the reducing-melting furnace must be vertically elongated to a considerably large length. Furthermore, it may be effective to provide baffle plates within the reducing-melting furnace 402 in order to reduce the falling speed of the granular compacts D, or to provide guides to make the granular compacts D whirl down. However, if falling-speed control members such as these baffle plates or guides are mounted at the lower portion of the reducing-melting furnace 402, metallic iron, which has been generated through reduction through the application of heat and has begun to melt through the further application of heat, may adhere to and accumulate on the falling-speed control members, resulting in the risk of hindering continuous operation. Therefore, these falling-speed control members are desirably mounted above a position where metallic iron begins to melt.

Figure 15:
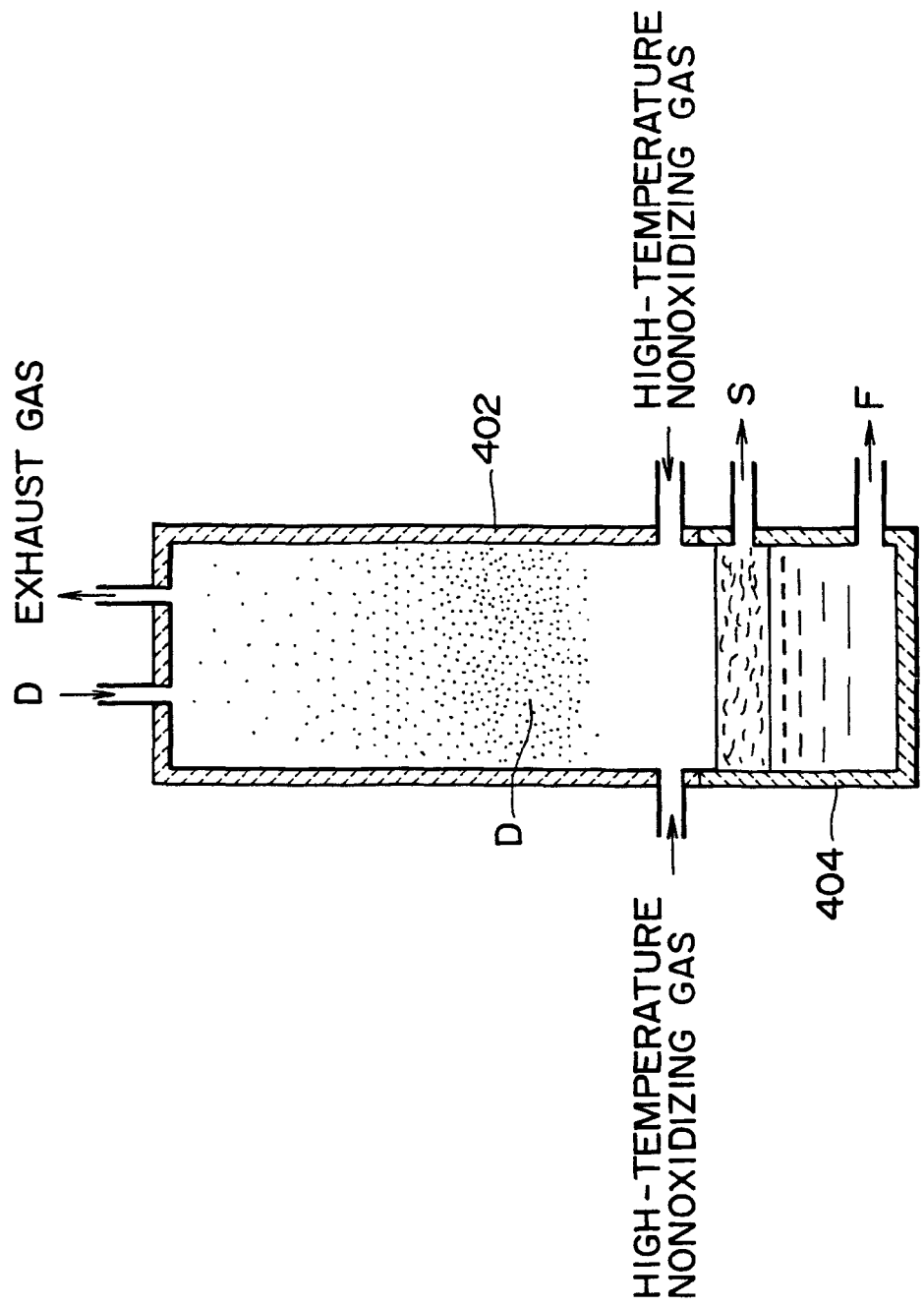
FIG. 15 is a schematic cross-sectional view showing an embodiment 6 (employing a suspension method) of a method and apparatus for making metallic iron according to the present invention.

FIG. 15 shows a schematic sectional view of Embodiment 6 of the present invention, which is constructed such that the falling speed of granular compacts D can be reduced with no requirement to mount falling-speed control members or the like. In Embodiment 6, a separator furnace 404 is integrally formed at the bottom portion of a reducing-melting furnace 402. Furthermore, a high-temperature non-oxidizing gas is fed into the thus-constructed furnace at positions just above the boundary between the reducing-melting furnace 402 and the separator furnace 404, thereby forcibly suspending the falling granular compacts D by an ascending current of the non-oxidizing gas. As a result, the residence time of the granular compacts D within the reducing-melting furnace 402 can be increased. In this case, while the suspended granular compacts D are subjected to reduction through the application of heat, a metallic iron shell is formed on the surface of the granular compact D, and a reducing reaction advances inside the shell. Subsequently, when the thus-formed metallic iron is melted through the further application of heat, molten iron fuses together to grow. The thus-grown molten iron falls downward. Accordingly, by adequately regulating the flow rate of the non-oxidizing gas in accordance with the resistance of the granular compacts D against the ascending current, the residence time of the granular compacts D within the reducing-melting furnace 402 can be regulated as desired. Therefore, while the granular compacts D are resident within the reducing-melting furnace 402, reduction through the application of heat can sufficiently be advanced. This application of heat for reduction may be attained by direct heating through the feed of a high-temperature non-reducing gas or by indirect heating through the use of burners or the like arranged around the reducing-melting furnace 402.

Figure 16:
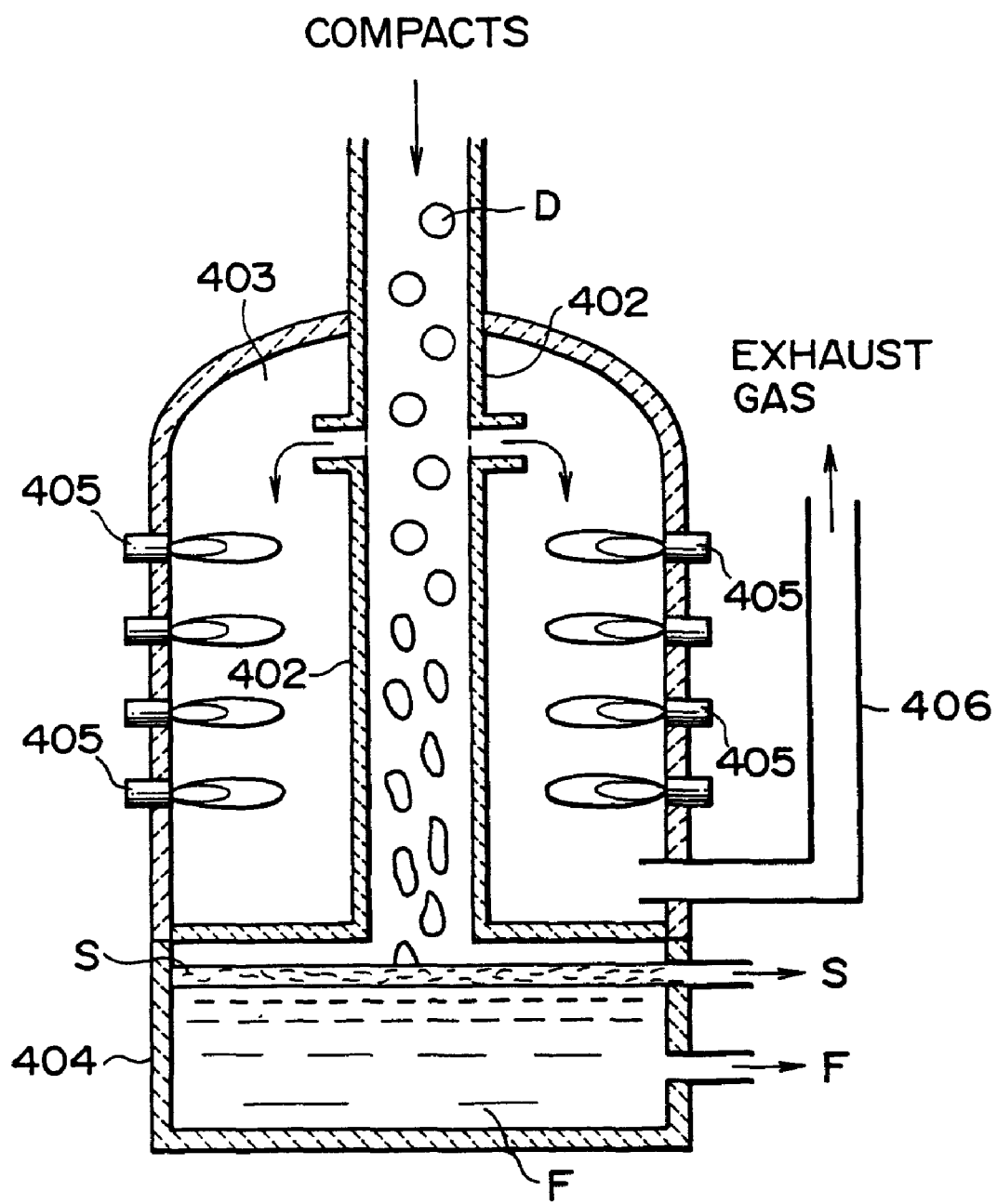
FIG. 16 is a schematic cross-sectional view showing an embodiment 7 (utilizing, as fuel, a reducing gas generated in a reducing process) of a method and apparatus for making metallic iron according to the present invention.

FIG. 16 shows a schematic sectional view of Embodiment 7 of the present invention. Embodiment 7 is constructed such that a reducing gas generated within the reducing-melting furnace 402 can be utilized as a fuel for indirectly heating the reducing-melting furnace 402. Since the granular compacts D used in the present invention contain a large amount of a carbonaceous reductant to effectively conduct a reducing agent as previously described, a gas within the reducing-melting furnace 402 contains combustible gas, and thus may be effectively used as a fuel gas. Therefore, this Embodiment 7 is constructed in the following manner to utilize the combustible gas. The reducing-melting furnace 402 is indirectly heated from outside with burners 405, and the reducing gas is extracted through the upper wall of the reducing-melting furnace 402 and led into a surrounding burner section 403, where the combustible gas is used as a fuel. The resulting exhaust gas is released through an exhaust outlet 406. This arrangement is preferable since the amount of a fuel used for heating can be reduced.

Also, in Embodiments 5 to 7, as described above in other Embodiments, the carbonaceous reductant contained in the above-described granular compact D is consumed, first, through reduction of iron oxide in a reducing process, and then through carburization of metallic iron, generated through the reduction. Solid reduced iron to undergo a melting process has a porous form and thus is likely to be re-oxidized. In order to prevent the reduced iron from being re-oxidized, the carbonaceous reductant must be contained in the granular compact D sufficiently against re-oxidization, so that the CO gas generated through combustion of the carbonaceous reductant establishes a non-oxidizing atmosphere around the granular compact D falling within the reducing-melting furnace 402. To attain this end, the granular compact D must contain the carbonaceous reductant in at least "amount required for reducing source iron oxide+amount consumed for carburizing reduced iron+amount of loss associated with oxidation within the furnace." In addition, in order to prevent reduced iron from being re-oxidized, the carbonaceous reductant or the CO gas may be additionally supplied in the amount of compensating a shortage into the lower portion of the reducing-melting furnace 402 or the separator furnace 404.

By employing a method of replenishing the separator furnace 404 with a carbonaceous reductant or previously containing the carbonaceous reductant in excess of a required amount in the granular compact D, even when some iron oxide which has not completely been reduced within the reducing-melting furnace 402 falls into the separator furnace 404, such iron oxide can be completely reduced within the separator furnace 404.

According to the above-described Embodiments 5 to 7, the granular compacts D are not subjected to any treatment before they are charged into the reducing-melting furnace 402. In order to reduce the length of the reducing-melting furnace 402 to thereby shorten time required for reduction through the application of heat, the granular compacts D may be prereduced before they are charged into the reducing-melting furnace 402. In this case, a prereducing apparatus must be provided upstream of the reducing-melting furnace 402.

Also, in Embodiments 5 to 7, as described above in other Embodiments, the separator furnace 404 may preferably be provided with a heating burner or an electric heating apparatus for further heating molten slag and iron to a higher temperature to thereby increase their fluidity, so that molten slag and molten iron can be more readily separated one from the other, thereby facilitating their separate release.

Embodiments 8 and 9

In Embodiments 8 and 9, an elongated compact of iron oxide which contains a carbonaceous reductant is reduced through the application of heat, thereby making metallic iron.

Specifically, the above-mentioned elongated compact is reduced through the application of heat while being moved downward in a vertical position. In the course of this reduction, a shell composed of metallic iron is generated and grown, and slag aggregates inside the shell. Subsequently, the metallic iron shell with a slag aggregate contained inside is further heated to be melted in the course of downward movement, followed by separation into molten slag and molten iron. Further, by adding a preceding process of continuously forming the elongated compact to the process of reduction through the application of heat, it becomes possible to continuously perform a series of processes of preparing the elongated compact serving as material for metallic iron, reducing the elongated compact through the application of heat, and separating metallic iron generated through the reduction from slag.

In the above-described process of reduction through the application of heat, reduction, first, advances from the surface of the elongated compact, thereby forming a shell composed of metallic iron. Subsequently, due to a reducing action of carbon monoxide generated from the carbonaceous reductant itself and through pyrolization of the carbonaceous reductant, the reducing reaction of CO with iron oxide efficiently advances inside the shell. Accordingly, generated metallic iron adheres together to aggregate while generated slag is melted to aggregate. As a result, in this thermal reduction process, a metallization ratio considerably increases, and the amount of iron oxide mixed into the slag considerably decreases.

In a section located underneath the section of reduction through the application of heat, further heating is performed to melt the metallic iron shell. The resulting molten substance, composed of molten iron and molten slag, falls into a separator located underneath, where molten iron and molten slag are separated one from the other due to their different specific gravities. Thus, highly reduced metallic iron can be efficiently obtained in the form of molten iron. Furthermore, since iron oxide is intensively reduced in the thermal reduction process, the amount of iron oxide mixed into the accompanying molten slag is significantly small. Therefore, the refractory of a melting apparatus can accordingly be prevented from damagingly being melted by iron oxide mixed into the molten slag.

Figure 17:
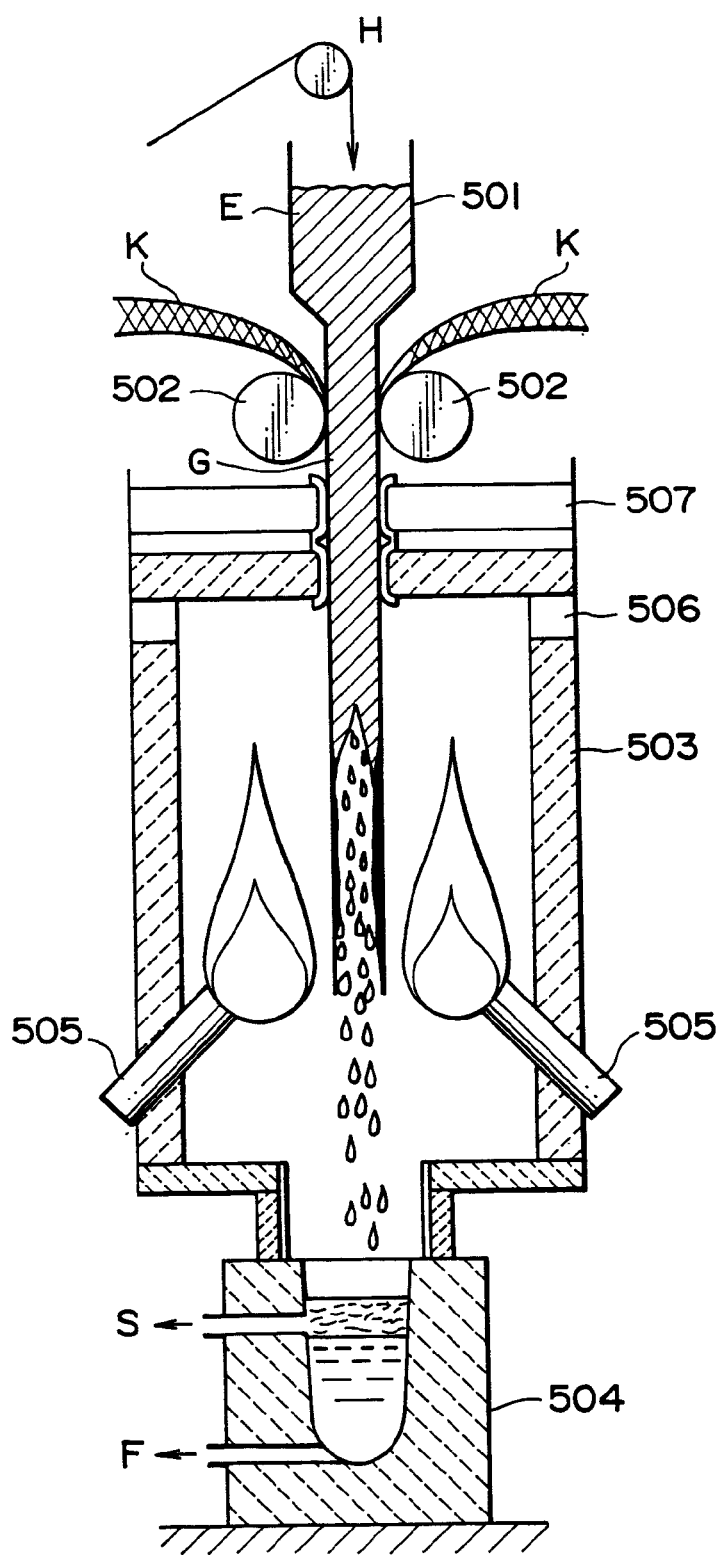
FIG. 17 is a schematic cross-sectional view showing an embodiment 8 of a method and apparatus for making metallic iron according to the present invention.

FIG. 17 shows a schematic sectional view of Embodiment 8 of the present invention, illustrating a method and apparatus for making metallic iron. In FIG. 17, reference numeral 501 denotes a material hopper; numeral 502 denotes compacting-feeding rollers (having functions of both a compacting apparatus and a feeding apparatus); numeral 503 denotes a thermal reduction furnace; and numeral 504 denotes a separator furnace serving as a separator. A mixture E, composed of a carbonaceous reductant such as coal or the like and iron oxide such as iron ore or the like and, as needed, a binder, is fed into the hopper 501 in the direction of arrow H. The compacting-feeding rollers 502 continuously compact the mixture E into an elongated compact G having a certain shape (usually a plate shape, a square bar shape, or a round bar shape) and certain dimensions, and feed the elongated compact G, maintained in a vertical position, into the thermal reduction furnace 503. The "vertical position" basically means a hanging position, but may somewhat (for example, ±5°) incline at a feeding section due to accuracy of a feeding apparatus without departing from the spirit of the present invention.

The thermal reduction furnace 503 has burners 505 serving as a heating member. As the elongated compact G lowers within the thermal reduction furnace 503, the elongated compact G is directly heated by flames of the burners 505. As a result, reduction advances from the surface of the elongated compact G toward the interior thereof, thereby forming a shell, composed mainly of metallic iron generated through reduction, on the surface as previously described. Carbon monoxide generated from a carbonaceous reductant and through pyrolization of the carbonaceous reductant establishes an intensive reducing atmosphere within the shell, thereby sharply accelerating reduction of iron oxide inside the shell. Therefore, by properly controlling the lowering speed of the elongated compact G and heating conditions in accordance with the length of the thermal reduction furnace 503, the intensive reducing atmosphere established within the metallic iron shell efficiently reduces iron oxide inside the shell, thereby obtaining a metallization ratio of not less than 95%, or in some cases of not less than 98%.

Slag, generated in the course of generation of metallic iron, melts inside the metallic iron shell at a lower temperature than metallic iron does. The thus-molten slag and the metallic iron shell fuse together in a separated state. As the elongated compact G further advances toward the lower portion of the thermal reduction furnace 503 and is heated further, the metallic iron shell also melts. The molten metallic iron, together with the molten slag, falls into the separator furnace 504 located underneath. In the separator furnace 504, molten slag S having a smaller specific gravity separately floats on the surface of molten iron F. Thus, the molten slag S is released from the separator furnace 504 at a location in the vicinity of the surface of the molten iron F while the molten iron F is released from the bottom portion of the separator furnace 504.

In FIG. 17, reference numeral 506 denotes exhaust gas outlets. As previously described, an exhaust gas may be released through the exhaust gas outlets 506 without any utilization thereof. However, since the exhaust gas has a high temperature and contains combustible gas, it may preferably be utilized as a fuel gas to be fed to the burners 505. In FIG. 17, reference numeral 507 denotes a gas seal portion.

The present invention may be embodied such that the aforementioned mixture is compacted to the elongated compact G merely through the application of pressure. Preferably, as shown in FIG. 17, the mixture is compacted through the application of pressure while being surrounded by a support mesh K made of iron, so that there is no risk that the elongated compact G would break while it is continuously lowering. The support mesh K is finally melted together with metallic iron, generated through reduction through the application of heat, and falls into the separator furnace 504. Therefore, the support mesh K is desirably made of iron. In place of an exterior reinforcement through the use of the support mesh K, an iron core (a stranded wire, or an iron wire having a rugged surface for increasing the effect of support may also be acceptable) may be inserted as reinforcement in the central portion of the elongated compact G.

Embodiment 9

Figure 18:
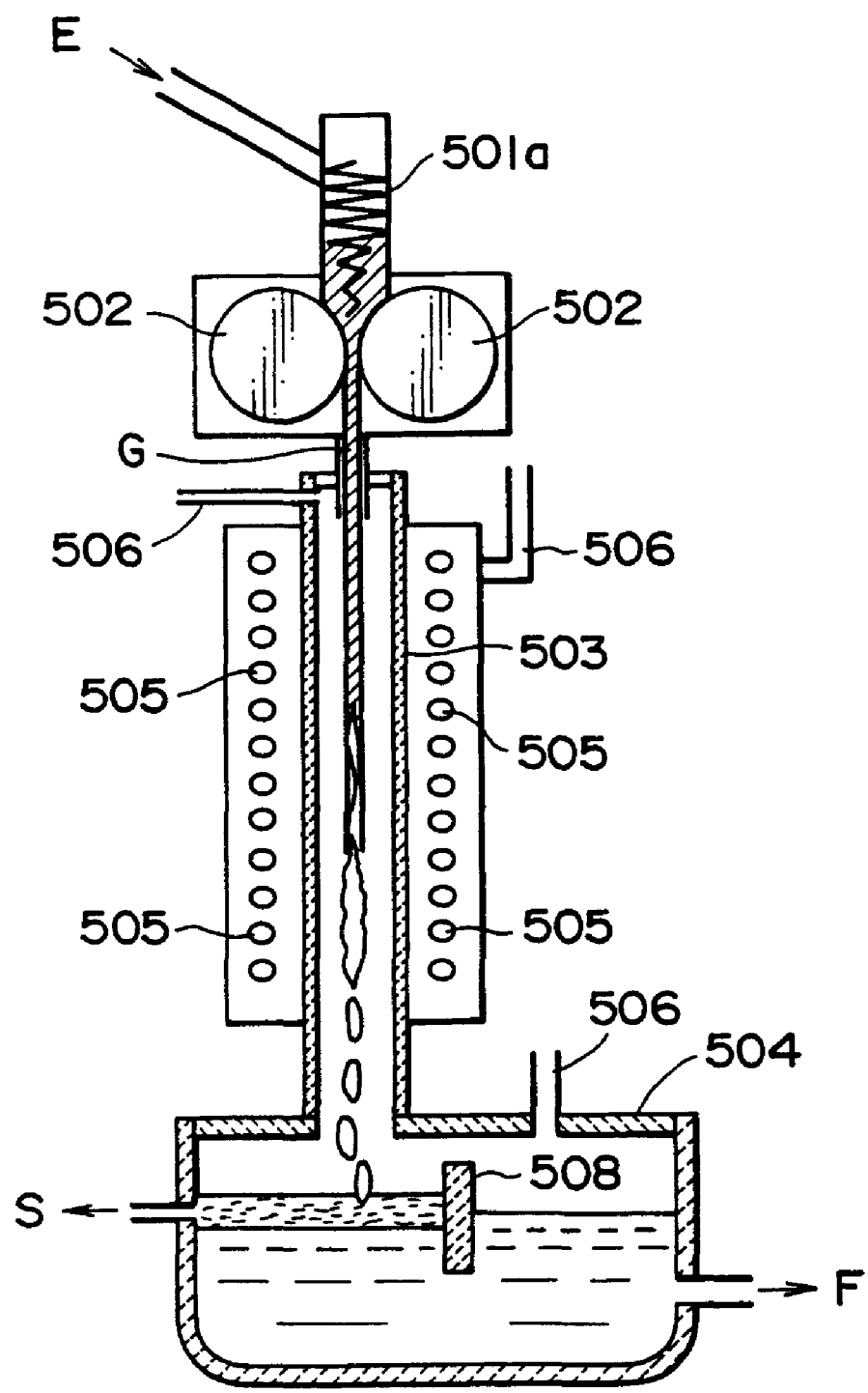
FIG. 18 is a schematic cross-sectional view showing an embodiment 9 of a method and apparatus for making metallic iron according to the present invention.

FIG. 18 shows a schematic sectional view of Embodiment 9 of the present invention. Embodiment 9 is basically similar to Embodiment 8 except that a mixture E, composed of a carbonaceous reductant, iron oxide, and a binder, is fed to compacting-feeding rollers 502 through a screw feeder 501a and that a thermal reduction furnace 503 is indirectly heated by burners 505 arranged therearound.

In the above-described Embodiments 8 and 9, the compacting-feeding rollers 502 simultaneously compact the mixture E to and feed the elongated compact G. However, separate apparatuses may be used for compacting and feeding. Alternatively, the elongated compact G may be previously prepared using a separate apparatus, and the thus-prepared elongated compact G may be fed into the thermal reduction furnace 503.

The carbonaceous reductant contained in the above-described elongated compact G is consumed first, through reduction of iron oxide in a reducing process, and then through carburization of metallic iron, generated through the reduction-Solid reduced iron to undergo a melting process has a porous form and thus is likely to be re-oxidized. In order to prevent the reduced iron from being re-oxidized, as previously described, the carbonaceous reductant must be contained in the granular compact D sufficiently against re-oxidization, so that the CO gas generated through combustion of the carbonaceous reductant establishes a non-oxidizing atmosphere around the elongated compact G moving downward within the thermal reduction furnace 503. To attain this end, the elongated compact G must contain the carbonaceous reductant in at least "amount required for reducing source iron oxide+amount consumed for carburizing reduced iron+ amount of loss associated with oxidation within the furnace." In addition, in order to prevent reduced iron from being re-oxidized, the carbonaceous reductant or the CO gas may be additionally supplied in the amount of compensating a shortage into the lower portion of the thermal reduction furnace 503 or the separator furnace 504.

As previously described, by employing a method of replenishing the separator furnace 504 with a carbonaceous reductant or previously containing the carbonaceous reductant in excess of a required amount in the elongated compact G, even when some iron oxide which has not completely been reduced within the thermal reduction furnace 503 falls into the separator furnace 504, such iron oxide can be completely reduced within the separator furnace 504.

In the above-described Embodiments 8 and 9, the elongated compact G is not subjected to any treatment before it is charged into the thermal reduction furnace 503. In order to reduce the length of the thermal reduction furnace 503 to thereby shorten time required for reduction through the application of heat, the elongated compact G may be prereduced before it is charged into the thermal reduction furnace 503. In this case, a prereducing apparatus must be provided upstream of the thermal reduction furnace 503. Also, as shown in FIG. 18, a submerged weir 508 may be provided within the separator furnace 504, thereby efficiently separating molten iron F and molten slag S one from the other.

Also, in Embodiments 8 and 9, the separator furnace 504 may preferably be provided with a heating burner or an electric heating apparatus for further heating molten slag and iron to a higher temperature to thereby increase their fluidity, so that molten slag and molten iron can be more readily separated one from the other, thereby more facilitating their separate release.

Embodiment 10

In a method of making metallic iron according to Embodiment 10 of the present invention, a granular (including pellet-like) or agglomerate compact of iron oxide which contains a carbonaceous reductant is conveyed on an iron belt and reduced through the application of heat, thereby making metallic iron. In the course of this reduction, a shell composed of metallic iron is generated and grown on the surface of the compact, and slag aggregates inside the shell. Subsequently, the compact in the form of the shell with a slag aggregate contained inside is further heated while being conveyed on the iron belt, so that the metallic iron shell, slag, and the iron belt used for conveyance are melted. The resultant molten substance is separated into molten slag and molten iron. According to the present embodiment, there can also be performed continuously a series of processes of reducing the compact through the application of heat, melting generated metallic iron and slag through the further application of heat, and separating molten iron and molten slag one from the other.

Figure 19A:
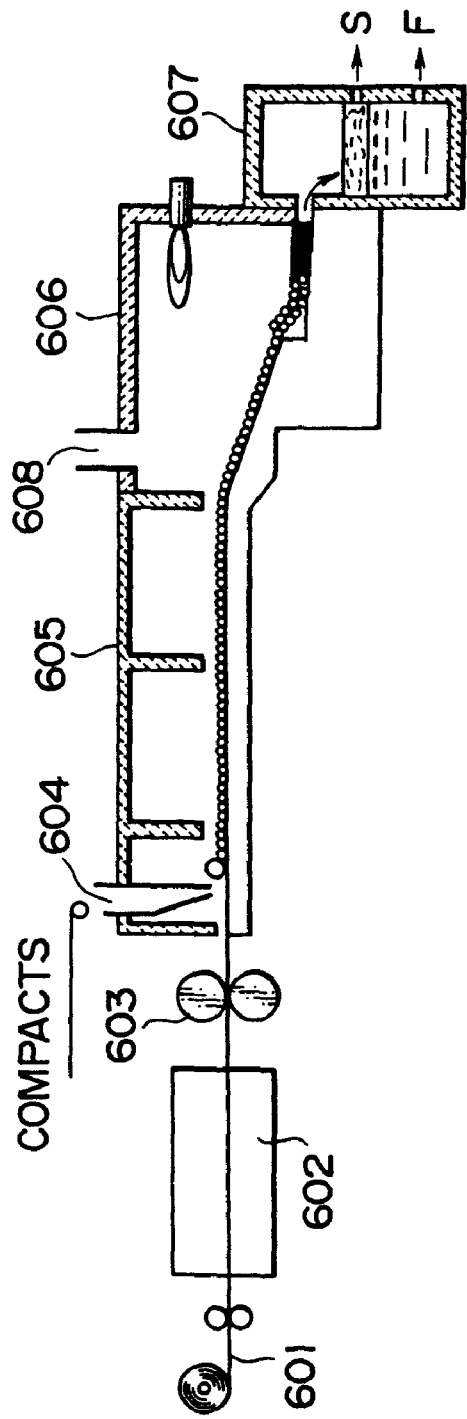
FIG. 19 is a schematic cross-sectional view showing an embodiment 10 of an apparatus for making metallic iron according to the present invention.

FIG. 19(a) is a schematic cross-sectional view showing an apparatus for making metallic iron for carrying out the above-described method. In FIG. 19(a), reference numeral 601 denotes an iron belt; numeral 602 denotes an annealing furnace; numeral 603 denotes a forming section; numeral 604 denotes a material hopper; numeral 605 denotes a thermal reduction furnace; numeral 606 denotes a melting furnace; and numeral 607 denotes a separator furnace.

Figure 19B:
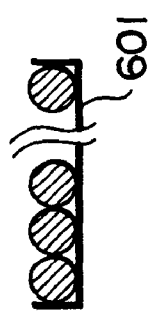

The present embodiment uses an iron belt 601 as means for conveying material compact. The iron belt 601 is annealed to be softened while passing through the annealing furnace 602. The thus-annealed iron belt 601 is formed at the forming section 603 into a gutter-like shape with both edges bent upright (see a partial transverse cross-section shown in FIG. 19(b)). The thus-formed iron belt 601 is continuously fed into the thermal reduction furnace 605. A mixture, composed of a carbonaceous reductant such as coal or the like and iron oxide such as iron ore or the like and, as needed, a binder, is compacted to a certain form such as pellets, thereby forming material compacts. The thus-prepared material compacts are placed onto the iron belt 601 through the material hopper 604 located at the upstream side of the thermal reduction furnace 605. The material compacts are continuously fed on the iron belt 601 toward the right of FIG. 19. Heating burners (not shown) are provided on side walls or ceiling portion of the thermal reduction furnace 605 so as to sequentially dry and reduce the material compacts through the application of heat. As previously described, in this thermal reduction process, reduction progresses from the surface of each compact due to a solid reductant contained in the compact, thereby forming a shell, composed mainly of metallic iron generated through reduction, on the surface of the compact. In addition, carbon monoxide generated from a carbonaceous reductant and through pyrolization of the carbonaceous reductant establishes an intensive reducing atmosphere within the shell, thereby sharply accelerating reduction of iron oxide inside the shell. Therefore, by properly determining the moving speed of the iron belt 601, heating conditions, etc. in accordance with the length of the thermal reduction furnace 605, the intensive reducing atmosphere established within the metallic iron shell efficiently reduces iron oxide inside the shell, thereby obtaining a metallization ratio of not less than 95%, or in some cases of not less than 98%.

Slag, generated in the course of generation of metallic iron, melts inside the metallic iron shell at a lower temperature than metallic iron does. The thus-molten slag aggregates inside and separately from the metallic iron shell. As the compact in the form of the metallic iron shell with a slag aggregate contained inside is further heated in the melting furnace 606 located downstream of the thermal reduction furnace 605, the metallic iron shell, slag inside the shell, and the iron belt 601 are all melted. The resulting molten substance flows toward the separator furnace 607. In the separator furnace 607, molten slag S having a smaller specific gravity separately floats on the surface of molten iron F. Thus, the molten slag S is released from the separator furnace 607 at a location in the vicinity of the surface of the molten iron F while the molten iron F is released from the bottom portion of the separator furnace 607.

In FIG. 19, reference numeral 608 denotes an exhaust gas outlet. An exhaust gas may be released through the gas outlet 608 without any utilization thereof. However, since the exhaust gas has a high temperature and contains combustible gas, it may desirably be utilized as a fuel gas to be fed to the burners of the thermal reduction furnace 605 and melting furnace 606, or as a heat source for preheating the combustion air. Material compacts fed from the material hopper 604 are preferably in the form of pellets and pre-dried, more preferably further pre-reduced since the length of the thermal reduction furnace 605 is reduced through the use of pre-reduced compacts. A compacting apparatus for preparing the material compacts in the form of pellets or the like may be disposed in the vicinity of the hopper 604, so that the material compacts prepared in the compacting apparatus are fed into the hopper 604. Through the employment of this arrangement, a process of preparing material compacts and a process of reduction through the application of heat is combined into a continuous process.

The actual design of the above-described apparatus for making metallic iron may be adequately modified so long as no deviation from the above-stated gist of the present invention is involved. Of course, such modifications are encompassed by the technological scope of the present invention. In operation, the above-described conditions and settings (operating temperature, the amount and form of use of a carbonaceous reductant, utilization of an exhaust gas, etc.) may adequately be selected.

Embodiment 11

In a method of making metallic iron according to Embodiment 11 of the present invention, an elongated material compact of iron oxide which contains a carbonaceous reductant is continuously prepared, conveyed, like Embodiment 10 described above, on an iron belt into a thermal reduction furnace, and reduced through the application of heat in the thermal reduction furnace, thereby making metallic iron. Accordingly, a series of processes of reduction through the application of heat, melting through the application of heat, and separation of molten iron is continuously performed. While the elongated compact conveyed on the iron belt is subjected to reduction through the application of heat, a shell composed of metallic iron is generated and grown on the surface of the elongated compact, and slag aggregates inside the shell. Subsequently, the compact in the form of the shell with a slag aggregate contained inside is further heated while being conveyed on the iron belt, so that the metallic iron shell, slag, and the iron belt used for conveyance are melted. The resultant molten substance is separated into molten slag and molten iron.

Figure 20A:
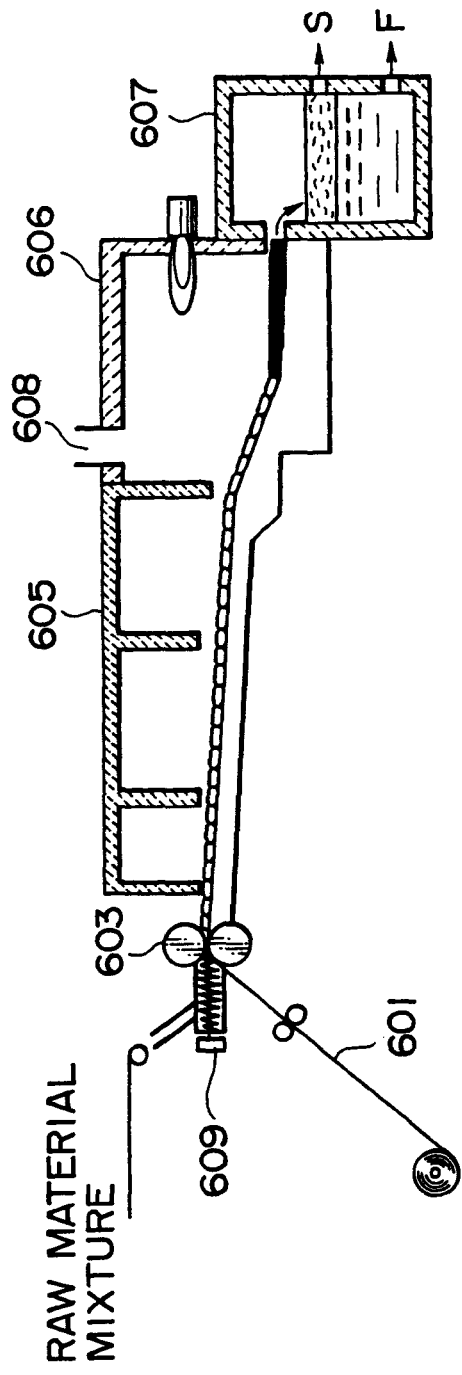
FIG. 20 is a schematic cross-sectional view showing an embodiment 11 of an apparatus for making metallic iron according to the present invention.

FIG. 20(a) is a schematic cross-sectional view showing an apparatus for making metallic iron for carrying out the above-described method. In FIG. 20(a), reference numeral 601 denotes an iron belt; numeral 603 denotes a forming section; numeral 609 denotes a screw feeder; numeral 605 denotes a thermal reduction furnace; numeral 606 denotes a melting furnace; and numeral 607 denotes a separator furnace.

Figure 20B:
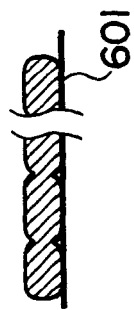

An elongated compact is continuously prepared and placed on the iron belt 601 so as to be conveyed on the iron belt 601 into the thermal reduction furnace 605. That is, as shown in FIG. 20, the screw feeder 609 is combined with the forming section 603. A mixture, composed of a carbonaceous reductant, iron oxide, and binder, is fed into the screw feeder 609, which feeds the mixture toward the forming section 603. Being fed with the mixture and the iron belt 601, the forming section 603 forms the kneaded mixture into an elongated form having a certain cross-section and placed on the iron belt 601 (see a partial transverse cross-section shown in FIG. 20(b)), and feeds the thus-formed elongated compact, together with the iron belt 601, into the thermal reduction furnace 605. The elongated compact may have a flat plate or bar shape, but is preferably shaped such that elongated projections and depressions are formed in a longitudinal direction in order to increase the surface area for efficient drying and reduction through the application of heat.

In the present embodiment, since the compact in an elongated form is continuously placed on the iron belt 601, there is no fear that the compact will tumble off the iron belt 601. Accordingly, the iron belt 601 may be flat. In addition, the iron belt 601 may be fed not only in a horizontal direction but also in an appropriately downward sloped direction for smooth conveyance.

The thermal reduction furnace 605 comprises an upstream drying section and a downstream thermal reduction section. Heating burners (not shown) are provided on side walls and ceiling portions of the drying and thermal reduction sections so as to sequentially dry and reduce the elongated compact through the application of heat. As previously described, in this thermal reduction process, reduction progresses from the surface of the elongated compact due to a solid reductant contained in the elongated compact, thereby forming a shell, composed mainly of metallic iron generated through reduction, on the surface of the elongated compact. In addition, carbon monoxide generated from a carbonaceous reductant and through pyrolization of the carbonaceous reductant establishes an intensive reducing atmosphere within the shell, thereby sharply accelerating reduction of iron oxide inside the shell. Therefore, by properly determining the moving speed of the iron belt 601, heating conditions, etc. in accordance with the length of the thermal reduction furnace 605, the intensive reducing atmosphere established within the metallic iron shell efficiently reduces iron oxide inside the shell.

Slag, generated in the course of generation of metallic iron, melts inside the metallic iron shell at a lower temperature than metallic iron does. The thus-molten slag aggregates inside and separately from the metallic iron shell. As the elongated compact in the form of the metallic iron shell with a slag aggregate contained inside is further heated in the melting furnace 606 located downstream of the thermal reduction furnace 605, the metallic iron shell, slag inside the shell, and the iron belt 601 are all melted. The resulting molten substance flows toward the separator furnace 607. In the separator furnace 607, molten slag S and molten iron F are separated one from the other in a manner as described previously.

The actual design of the above-described apparatus for making metallic iron may be adequately modified so long as no deviation from the above-stated gist of the present invention is involved. Of course, such modifications are encompassed by the technological scope of the present invention. In operation, the above-described conditions and settings (operating temperature, the amount and form of use of a carbonaceous reductant, utilization of an exhaust gas, etc.) may adequately be selected.

Embodiment 12

In a method of making metallic iron according to Embodiment 12 of the present invention, a number of elongated compacts of iron oxide which contains a carbonaceous reductant are continuously prepared in parallel by a number of compacting apparatuses disposed in parallel. The thus-prepared elongated compacts are continuously fed in parallel along a sloped surface into a heat-drying-reducing furnace, and reduced through the application of heat therein. Subsequently, metallic iron generated through reduction and accompanying slag are led into a melting furnace. The resultant molten substance is led into a separator, where molten iron and molten slag are separated one from the other, thereby obtaining metallic iron.

Figure 21:
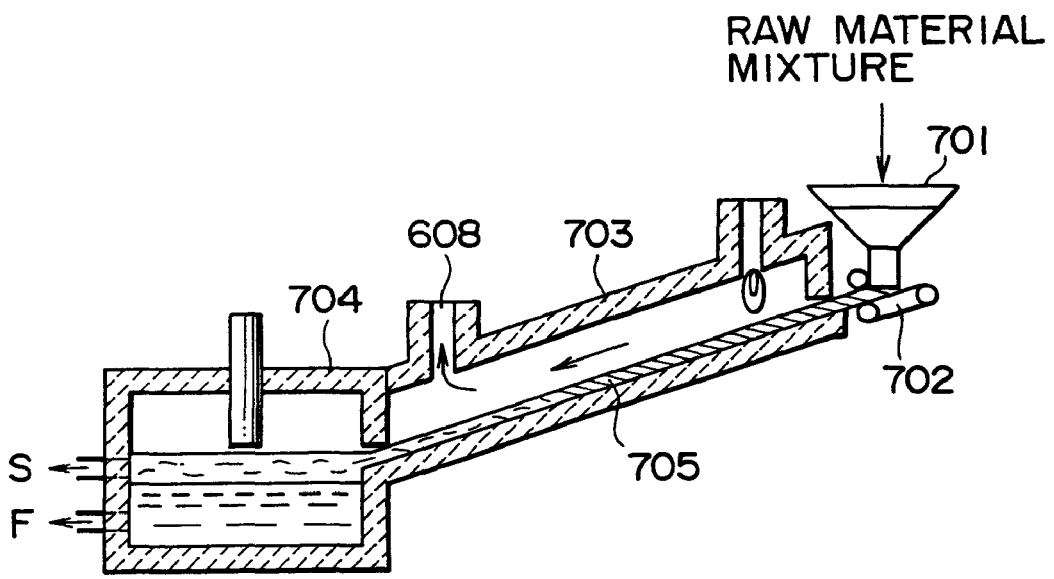
FIG. 21 is a schematic cross-sectional view showing an embodiment 12 of an apparatus for making metallic iron according to the present invention.
Figure 22:
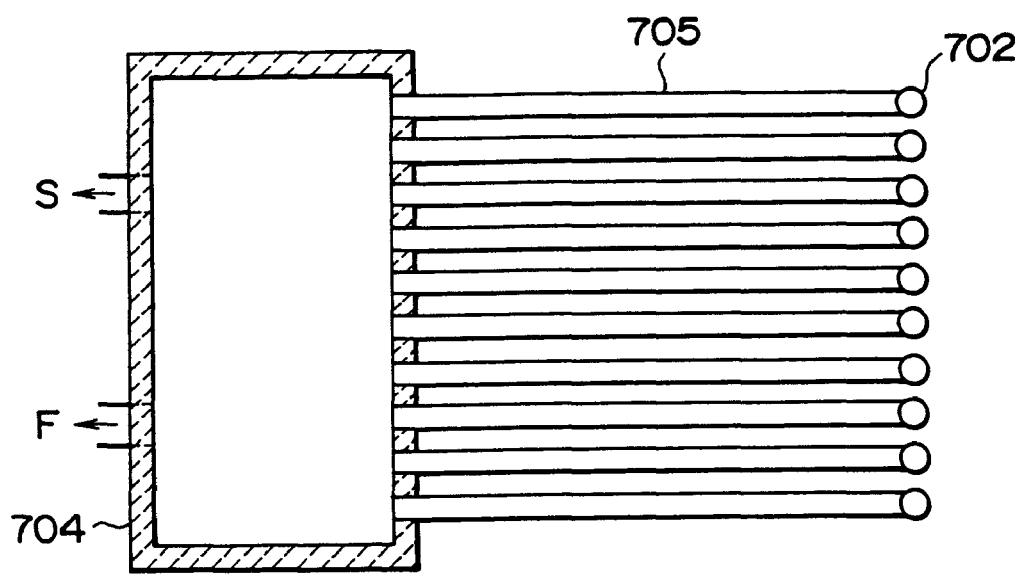
FIG. 22 is a schematic plan view showing the embodiment 12 of an apparatus for making metallic iron according to the present invention.

FIG. 21 is a schematic cross-sectional view showing an apparatus of making metallic iron for carrying out the above-described method, and FIG. 22 is a schematic plan view of the apparatus. In FIGS. 21 and 22, reference numeral 701 denotes a material hopper; numeral 702 denotes compacting devices; numeral 703 denotes a heating furnace serving as drying, reducing, and melting furnaces; numeral 704 denotes a separator furnace; and numeral 705 denotes elongated compacts.

In the present embodiment, as shown in FIGS. 21 and 22, the heating furnace 703 having a sloped surface, sloping down toward the separator furnace 704, is provided on one side or both sides (on one side in FIGS. 21 and 22) of the elongated separator furnace 704. Each heating furnace 703 is provided with a heating burner apparatus and a number of the compacting devices 702 across the width thereof (in a direction perpendicular to the paper surface of FIG. 21) at the upper end portion thereof as shown in FIG. 22. Each heating furnace 703 prepares plate or bar-like elongated compacts 705, feeds these elongated compacts 705 into the heating furnace 703 along the sloped surface of the heating furnace 703. Moving downward along the sloped surface, the elongated compacts 705 are dried and reduced through the application of heat. As previously described, in this thermal reduction process, reduction progresses from the surface of each elongated compact 705 due to a solid reductant contained in the elongated compact 705, thereby forming a shell, composed mainly of metallic iron generated through reduction, on the surface of the elongated compact 705. In addition, carbon monoxide generated from a carbonaceous reductant and through pyrolization of the carbonaceous reductant establishes an intensive reducing atmosphere within the shell, thereby sharply accelerating reduction of iron oxide inside the shell.

The metallic iron generated through reduction and accompanying slag are further heated and melted at the downstream portion of the heating furnace 703. The resulting molten substance flows into the separator furnace 704. A number of the elongated compacts 705 fed into the heating furnace 703 concurrently undergo the above-described reduction and melting through the application of heat.

Therefore, by properly determining the moving speed of the elongated compacts 705, heating conditions, etc. in accordance with the length of the heating furnace 703, a metallic iron shell is generated on the surface of each elongated compact 705, and the intensive reducing atmosphere established within the metallic iron shell efficiently reduces iron oxide inside the shell, thereby obtaining a metallization ratio of not less than 95%, or in some cases of not less than 98%. The thus-generated metallic iron and accompanying slag are further heated and melted. The resulting molten substance flows into the separator furnace 704.

In the separator furnace 704, molten slag S having a smaller specific gravity separately floats on the surface of molten iron F. Thus, the molten slag S is released from the separator furnace 704 at a location in the vicinity of the surface of the molten iron F while the molten iron F is released from the bottom portion of the separator furnace 704.

The above-described apparatus allows a user to adjust, as desired, the production of metallic iron per unit time through adjustment of the size, number, feeding rate. etc. of elongated compacts in accordance with the scale or heating capability of the heating section of the heating furnace 703, or to readily design and construct an apparatus in accordance with a target production.

The actual design of the above-described apparatus for making metallic iron may be adequately modified so long as no deviation from the above-stated gist of the present invention is involved. Of course, such modifications are encompassed by the technological scope of the present invention. In operation, the above-described conditions and settings (operating temperature, the amount and form of use of a carbonaceous reductant, utilization of an exhaust gas, etc.) may adequately be selected.

When the present invention is embodied as described above in Embodiments 2 to 12, in a thermal reduction process, slag generated must melt at a lower temperature than does metallic iron generated through reduction in order to successfully reduce iron oxide in a solid-phase state, as previously described. To meet this requirement, the composition of slag components (gangue components mixed in iron ore, generally used as source iron oxide, and a carbonaceous reductant) contained in a compact (or an elongated compact) must be controlled such that the melting point of generated slag is lower than that of reduced iron before and after carburization. Therefore, it may be desirable in some cases that $Al_2O_3$, $SiO_2$, CaO, etc. be added to a source mixture of the compact (or the elongated compact) in a compacting process to thereby reduce the melting point of generated slag.

The present invention is not limited to the above-described embodiments. Numerous modifications and variations of the present invention are possible in light of the spirit of the present invention, and they are not excluded from the scope of the present invention.

INDUSTRIAL APPLICABILITY

As has been described above, according to the present invention, compacts of iron oxide containing a carbonaceous reductant are subjected to reduction through the application of heat, at the incipient stage of which a metallic iron shell is formed. Once the metallic iron shell is formed, iron oxides are reduced under an enhanced reducing condition which is established within the metallic iron shell, whereby the reducing reaction progresses quickly and efficiently. Therefore, the method of the invention can efficiently produce, via reduction through the application of heat and in a short period of time, metallic iron having such a high iron purity, with a metallization ratio of not less than 95%, or in some cases of not less than 98%, which cannot be attained by conventional direct iron making methods. The thus obtained metallic iron having a relatively high iron purity and accompanying slag may be solidified by chilling and then crushed to separate metallic iron from slag magnetically or by any other screening method or may be melted by further heating so as to separate one from the other through a difference in their specific gravities.

Further, the method of the present invention can make the iron oxide content of slag relatively small, so that it does not do damage to the refractory of a furnace, which would normally result from contact of molten iron oxide with the refractory.

The apparatus for making metallic iron according to the present invention can efficiently carry out, in an industrial scale, the above-proposed new technique for making metallic iron, and can productively and effectively produce high-purity metallic iron having a metallization ratio of not less than 95%, or in some cases of not less than 98%, in a relatively short period of time from source iron oxide having a high iron content, even from an iron source having a low iron content, such as iron ore or the like. Through the employment of the above-described method and apparatus for making metallic iron, the amount of iron oxide mixed into slag accompanyingly generated in a process of reduction considerably decreases, thereby minimizing damage caused by molten iron oxide to the refractory lining of a thermal reduction apparatus, melting apparatus, separator, separator furnace, and the like.

The invention claimed is:

1. A method for producing metallic iron, comprising:
   (A) heating to a temperature in a range of 1430° C. to 1540° C. a compact selected from the group consisting of an agglomerate, a grain, a briquette, a pellet and a bar, the compact comprising a mixture of an iron oxide and a solid carbonaceous reducing agent;
   (B) reducing said iron oxide by using said solid carbonaceous reducing agent until the compact comprises 5% by weight or less of said iron oxide;
   (C) producing from the compact a metallic iron and slag within the metallic iron;
   (D) melting at least part of said metallic iron; and
   (E) separating said metallic iron from said slag, wherein the reducing and the melting occur while the compact is being moved by a horizontal surface.

2. The method according to claim 1, wherein the reducing and the melting occur in a rotary hearth furnace.

3. The method according to claim 1, wherein the heating is to a temperature in a range of 1430° C. to 1500° C.

4. The method according to claim 1, wherein the compact is the agglomerate.

5. The method according to claim 1, wherein the compact is the briquette.

6. The method according to claim 1, wherein after the separating said metallic iron has a metallization ratio of not less than 95%.

7. The method according to claim 1, wherein
   in (C) the slag within the metallic iron is molten slag; and
   in (D) the melting forms a hole in the metallic iron so that the molten slag flows out from within the metallic iron.

8. A method for producing metallic iron, comprising:
   (A) heating to a temperature in a range of 1430° C. to 1540° C. a compact selected from the group consisting of an agglomerate, a grain, a briquette, a pellet and a bar, the compact comprising a mixture of an iron oxide and a solid carbonaceous reducing agent;
   (B) reducing said iron oxide until the compact comprises 5% by weight or less of said iron oxide;
   (C) producing from the compact a metallic iron and slag within the metallic iron;
   (D) melting at least part of said metallic iron; and
   (E) separating said metallic iron from said slag, wherein the reducing and the melting occur while the compact is being moved by a horizontal surface.

9. The method according to claim 8, wherein the reducing and the melting occur in a rotary hearth furnace.

10. The method according to claim 8, wherein the heating is to a temperature in a range of 1430° C. to 1500° C.

11. The method according to claim 8, wherein the compact is the agglomerate.

12. The method according to claim 8, wherein the compact is the briquette.

13. The method according to claim 8, wherein after the separating said metallic iron has a metallization ratio of not less than 95%.

14. The method according to claim 8, wherein
   in (C) the slag within the metallic iron is molten slag; and
   in (D) the melting forms a hole in the metallic iron so that the molten slag flows out from within the metallic iron.

15. A method for producing metallic iron, comprising:
   (A) heating to a temperature in a range of 1430° C. to 1540° C. a compact selected from the group consisting of an agglomerate, a grain, a briquette, a pellet and a bar, the compact comprising a mixture of an iron oxide, a solid carbonaceous reducing agent, and a binder;
   (B) reducing said iron oxide until the compact comprises 5% by weight or less of said iron oxide;
   (C) producing from the compact a metallic iron and slag within the metallic iron;
   (D) melting at least part of said metallic iron; and
   (E) separating said metallic iron from said slag, wherein the reducing and the melting occur while the compact is being moved by a horizontal surface in a horizontal direction.

16. The method according to claim 15, wherein the reducing and the melting occur in a rotary hearth furnace.

17. The method according to claim 15, wherein the heating is to a temperature in a range of 1430° C. to 1500° C.

18. The method according to claim 15, wherein the compact is the agglomerate.

19. The method according to claim 15, wherein the compact is the briquette.

20. The method according to claim 15, wherein after the separating said metallic iron has a metallization ratio of not less than 95%.

21. The method according to claim 15, wherein the binder comprises bentonite.

22. The method according to claim 15, wherein
in (C) the slag within the metallic iron is molten slag; and
in (D) the melting forms a hole in the metallic iron so that the molten slag flows out from within the metallic iron.

* * * * *